US012681495B2

(12) United States Patent
Aldweesh et al.

(10) Patent No.: US 12,681,495 B2
(45) Date of Patent: Jul. 14, 2026

(54) SMART MINING EXPLORATION ROBOTIC SYSTEM WITH ARTIFICIAL INTELLIGENCE ENHANCED MECHANICAL SYNCHRONIZATION FOR MINERAL DETECTION

(71) Applicant: SHAQRA UNIVERSITY, Shaqra (SA)

(72) Inventors: Amjad Aldweesh, Shaqra (SA); Mohammed Alghassab, Shaqra (SA)

( * ) Notice: Subject to any disclaimer, the term of this patent is extended or adjusted under 35 U.S.C. 154(b) by 0 days.

(21) Appl. No.: 19/372,011

(22) Filed: Oct. 28, 2025

(65) Prior Publication Data

US 2026/0056549 A1 Feb. 26, 2026

(51) Int. Cl.

| | |
|---|---|
| *G05D 1/495* | (2024.01) |
| *G01S 13/88* | (2006.01) |
| *G05D 1/689* | (2024.01) |
| *G05D 105/80* | (2024.01) |
| *G05D 107/70* | (2024.01) |
| *G05D 109/10* | (2024.01) |
| *G05D 111/30* | (2024.01) |
| *G05D 111/67* | (2024.01) |

(52) U.S. Cl.
CPC ............ *G05D 1/495* (2024.01); *G01S 13/885* (2013.01); *G05D 1/689* (2024.01); *G05D 2105/87* (2024.01); *G05D 2107/73* (2024.01); *G05D 2109/10* (2024.01); *G05D 2111/30* (2024.01); *G05D 2111/67* (2024.01)

(58) Field of Classification Search
CPC .... G05D 1/495; G05D 1/689; G05D 2105/87; G05D 2107/73; G05D 2109/10; G05D 2111/30; G05D 2111/67; G01S 13/885

USPC .......................................................... 701/23
See application file for complete search history.

(56) References Cited

U.S. PATENT DOCUMENTS

| | | | | |
|---|---|---|---|---|
| 11,079,487 B2 * | 8/2021 | Reed | ..................... | G01S 13/885 |
| 12,210,092 B1 * | 1/2025 | Fonts | ..................... | G01S 7/414 |
| 12,461,228 B1 * | 11/2025 | Kramer | ................... | G01S 13/88 |
| 2008/0246647 A1 * | 10/2008 | Hellsten | .................. | G01S 7/025 |
| | | | | 342/25 A |
| 2011/0301785 A1 * | 12/2011 | Sword | .................. | B62D 55/075 |
| | | | | 701/2 |
| 2014/0121881 A1 * | 5/2014 | Diazdelcastillo | .... | G05D 1/0274 |
| | | | | 180/9.1 |
| 2015/0105965 A1 * | 4/2015 | Blackwell | ............ | B62D 63/025 |
| | | | | 701/28 |
| 2018/0081079 A1 * | 3/2018 | Pyke | ....................... | G01S 17/86 |
| 2019/0064362 A1 * | 2/2019 | Scott | ..................... | G01S 13/865 |
| 2020/0264615 A1 * | 8/2020 | Bryner | ................. | G01N 29/223 |

(Continued)

*Primary Examiner* — Mohamed Abdo Algehaim
(74) *Attorney, Agent, or Firm* — Maschoff Brennan

(57) ABSTRACT

The invention provides a smart mining exploration robotic system capable of detecting and mapping subsurface minerals through a synchronized integration of mechanical, electromechanical, and computational subsystems. The system features a modular chassis frame, a reconfigurable traction assembly capable of switching between wheel and track modes, a dynamically balanced suspension system, a sensor stabilization assembly employing a gimbal mechanism, and a synchronizing drive assembly that distributes mechanical motion among the propulsion, damping, and sensing components. A processing unit receives real-time mechanical state information and sensor data to produce terrain-referenced mineral maps with high spatial and temporal precision.

19 Claims, 6 Drawing Sheets

(56)  References Cited

U.S. PATENT DOCUMENTS

| | | | | |
|---|---|---|---|---|
| 2022/0194580 | A1* | 6/2022 | Cowgill | B25J 5/00 |
| 2022/0253063 | A1* | 8/2022 | Frick | A01D 34/824 |
| 2023/0152279 | A1* | 5/2023 | Jun | G01N 29/4481 |
| | | | | 702/56 |
| 2023/0236604 | A1* | 7/2023 | Frick | G05D 1/2297 |
| | | | | 701/23 |
| 2023/0400446 | A1* | 12/2023 | Karydis | G05D 1/248 |
| 2024/0134007 | A1* | 4/2024 | Feng | G01S 7/412 |
| 2024/0151551 | A1* | 5/2024 | Lawver | G01C 21/3896 |
| 2024/0184306 | A1* | 6/2024 | Asmari | G01S 17/89 |
| 2024/0290091 | A1* | 8/2024 | Tissera | G06V 10/143 |
| 2024/0408773 | A1* | 12/2024 | Asmari | G01C 21/3811 |
| 2025/0189507 | A1* | 6/2025 | Hoelen | G05D 1/0297 |
| 2025/0291366 | A1* | 9/2025 | Gattis | H04W 4/80 |
| 2025/0346304 | A1* | 11/2025 | Rosencrance | B60K 1/00 |
| 2025/0348085 | A1* | 11/2025 | Ho | G05D 1/648 |
| 2026/0015816 | A1* | 1/2026 | Dianics | E02F 9/24 |
| 2026/0029791 | A1* | 1/2026 | Chan | G05D 1/242 |

* cited by examiner

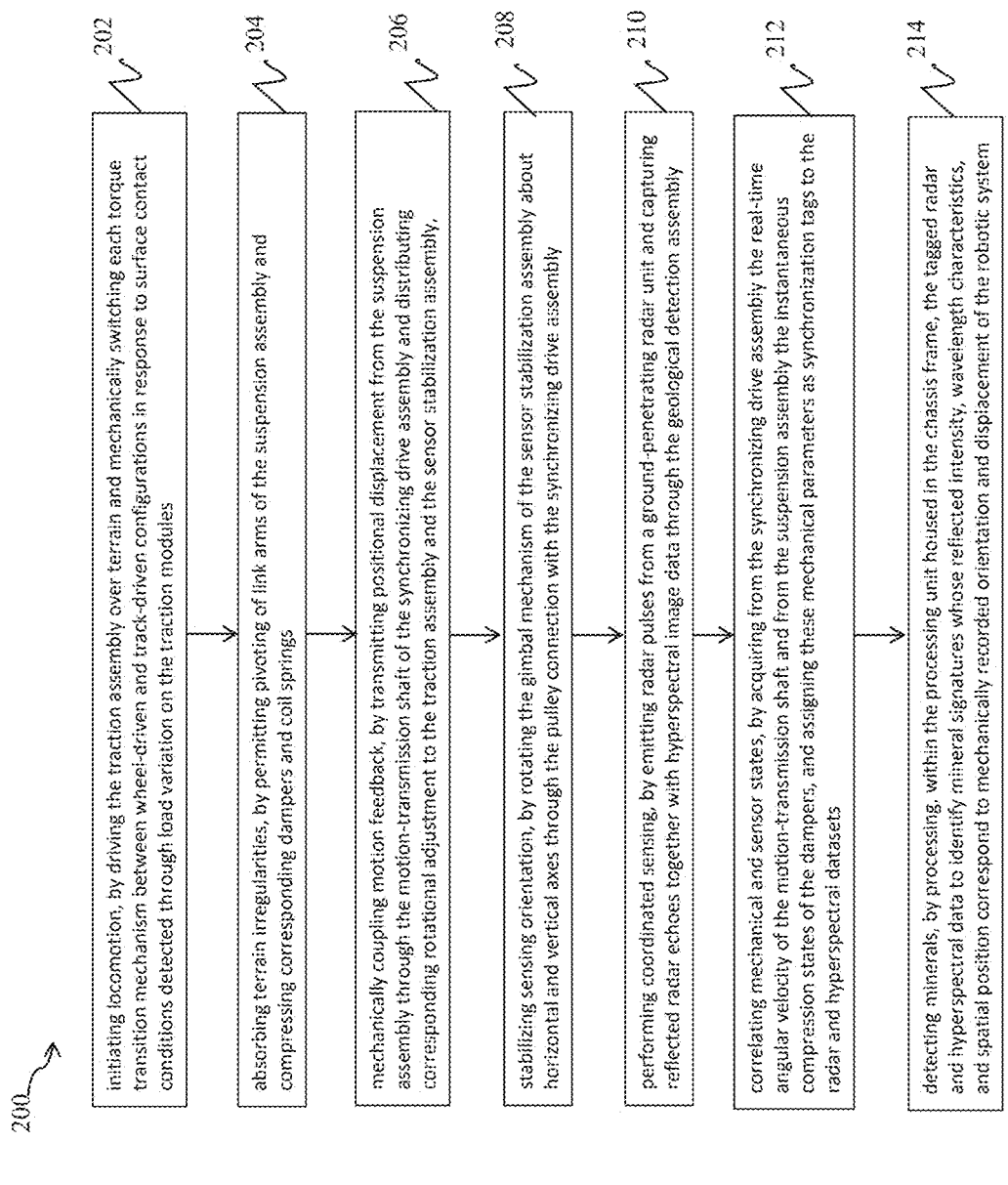

202 initiating locomotion, by driving the traction assembly over terrain and mechanically switching each torque transition mechanism between wheel-driven and track-driven configurations in response to surface contact conditions detected through load variation on the traction modules

204 absorbing terrain irregularities, by permitting pivoting of link arms of the suspension assembly and compressing corresponding dampers and coil springs

206 mechanically coupling motion feedback, by transmitting positional displacement from the suspension assembly through the motion-transmission shaft of the synchronizing drive assembly and distributing corresponding rotational adjustment to the traction assembly and the sensor stabilization assembly,

208 stabilizing sensing orientation, by rotating the gimbal mechanism of the sensor stabilization assembly about horizontal and vertical axes through the pulley connection with the synchronizing drive assembly

210 performing coordinated sensing, by emitting radar pulses from a ground-penetrating radar unit and capturing reflected radar echoes together with hyperspectral image data through the geological detection assembly

212 correlating mechanical and sensor states, by acquiring from the synchronizing drive assembly the real-time angular velocity of the motion-transmission shaft and from the suspension assembly the instantaneous compression states of the dampers, and assigning these mechanical parameters as synchronization tags to the radar and hyperspectral datasets

214 detecting minerals, by processing, within the processing unit housed in the chassis frame, the tagged radar and hyperspectral data to identify mineral signatures whose reflected intensity, wavelength characteristics, and spatial position correspond to mechanically recorded orientation and displacement of the robotic system

200

Figure 2 two-axis gimbal mechanism (130)

Upper sensor interface (116)

chassis frame (102)

processing unit (112)

coil spring (106c)

Mechanical signal converter (142)

lower traction interface (114)

plurality of link arms (106a)

Traction assembly (104)

Joint connector (106b)

coupling shaft (104c)

100 ground-penetrating radar unit (144)

vertical axis (134)

inner ring (108a)

base ring (132)

108 hyperspectral imaging unit (138)

sensor carrier plate (136)

SMART MINING EXPLORATION ROBOTIC SYSTEM WITH ARTIFICIAL INTELLIGENCE ENHANCED MECHANICAL SYNCHRONIZATION FOR MINERAL DETECTION

TECHNICAL FIELD

The present invention relates to the field of autonomous mining and geological exploration systems, more particularly to robotic exploration vehicles designed for subsurface mineral detection and geological mapping.

BACKGROUND OF THE INVENTION

Conventional mining exploration relies heavily on manually operated ground-penetrating radar and spectroscopic instruments, which are both time-consuming and prone to errors arising from terrain irregularities, inconsistent sensor orientation, and poor spatial correlation between sensor data and the physical movement of the system. While modern robotic platforms have been employed in mining applications, they often depend on electronic or inertial feedback systems that suffer from drift, lag, and misalignment during continuous locomotion. Moreover, most existing systems treat mechanical and sensing subsystems as independent entities, resulting in uncoordinated sensor readings and unreliable mineral detection outputs.

There exists a need for a robotic exploration system that achieves mechanical-sensor synchronization, ensuring that every sensing event is physically referenced to the robot's mechanical motion and orientation. Such synchronization would enable precise geological mapping, eliminate sensor drift, and correlate mechanical resistance with mineral characteristics, thus increasing detection accuracy and exploration efficiency.

The mining industry has historically relied on exploration methods that combine manual geological surveying, core drilling, and laboratory analysis to determine the presence and quality of mineral deposits. These traditional methods, though reliable in some aspects, are limited by their high operational costs, slow pace, and inability to provide continuous spatially-referenced subsurface information. As exploration moved into more remote, uneven, and hazardous terrains, there emerged a growing need for autonomous or semi-autonomous systems that could traverse complex geological landscapes while performing real-time mineral detection and mapping. To address this, several technologies have been developed, ranging from ground-penetrating radar (GPR) mounted on mobile platforms to drone-assisted spectral mapping systems. However, the transition from static to dynamic exploration brought forward numerous challenges, particularly concerning synchronization between mechanical motion, sensor stability, and data accuracy.

One of the earliest attempts at automating mineral exploration involved the use of ground-penetrating radar units mounted on wheeled vehicles or carts. These systems provided valuable subsurface profiles by emitting electromagnetic pulses into the ground and analyzing reflected signals from subsurface layers. While effective in flat terrains, GPR-based wheeled systems suffered from instability and inconsistent data acquisition when used in rugged or undulating surfaces. Vibrations, wheel slippage, and chassis tilt introduced signal distortion, causing radar reflections to misalign with their actual ground positions. Moreover, because these systems lacked any form of active sensor stabilization, the radar antenna's orientation varied with terrain inclination, reducing the accuracy of subsurface depth estimation and causing significant spatial errors in the resulting geological maps. Attempts to mitigate these issues using electronic stabilization systems or gyroscopes introduced latency and calibration drift, which further complicated real-time mapping operations.

The evolution of tracked robotic platforms introduced improvements in terrain adaptability and stability. Continuous tracks provided better traction on loose or uneven surfaces and distributed weight more uniformly than wheels. However, tracked robots introduced a new challenge: the vibration frequency of tracks interacting with the ground often overlapped with radar pulse repetition frequencies, generating harmonic noise that corrupted subsurface data. Additionally, the conversion between static and dynamic traction modes caused unpredictable torque variations, affecting the radar's timing synchronization. The mechanical feedback loops in these systems were largely decoupled from sensor control techniques, meaning that terrain-induced vibration and deformation were not accounted for in signal processing. As a result, data collected from such systems frequently exhibited noise artifacts and misaligned reflection peaks that hindered accurate mineral interpretation.

In more advanced robotic mining systems, inertial measurement units (IMUs) and accelerometers were introduced to monitor chassis orientation and compensate for mechanical disturbance in real time. These systems employed digital stabilization techniques to correct radar beam direction and image alignment. However, IMU-based compensation systems rely heavily on electronic sensors that are prone to drift over extended operation times. Small cumulative errors in pitch, roll, and yaw estimation, when integrated over long durations, led to considerable positional inaccuracies in subsurface maps. Furthermore, electronic stabilization methods are highly sensitive to electromagnetic interference—an environment that is common in active mining sites due to the presence of heavy electrical equipment and metallic structures. In these environments, magnetic and electronic noise degraded the precision of sensor calibration and caused instability in the feedback loop. Thus, while IMU-based systems improved upon the purely mechanical platforms, they failed to achieve long-term consistency and reliability in complex field conditions.

The existing mining exploration robots and sensor-mounted vehicles are limited by several interrelated shortcomings: lack of real-time mechanical-sensor synchronization, dependence on drift-prone electronic stabilization, susceptibility to vibration and slippage, and disjointed data fusion architectures. These systems can either maintain mechanical stability or collect high-resolution sensor data, but not both simultaneously under dynamic conditions. What the industry requires is an integrated solution that mechanically couples propulsion, suspension, and sensing systems through a single synchronized drive mechanism, enabling every sensor operation to occur in deterministic alignment with the machine's physical state. Only through such mechanical-computational integration can continuous, drift-free, and high-fidelity subsurface mineral mapping be achieved in real-world exploration environments.

SUMMARY OF THE INVENTION

The invention provides a smart mining exploration robotic system capable of detecting and mapping subsurface minerals through a synchronized integration of mechanical, electromechanical, and computational subsystems. The system features a modular chassis frame, a reconfigurable traction assembly capable of switching between wheel and track modes, a dynamically balanced suspension system, a sensor stabilization assembly employing a gimbal mechanism, and a synchronizing drive assembly that distributes mechanical motion among the propulsion, damping, and sensing components. A processing unit receives real-time mechanical state information and sensor data to produce terrain-referenced mineral maps with high spatial and temporal precision.

The primary object of the present invention is to provide a smart mining exploration robotic system that achieves precise and reliable subsurface mineral detection by establishing a direct mechanical synchronization between its motion and sensing components. This system is designed to overcome the limitations of conventional exploration platforms that suffer from sensor drift, mechanical instability, and inconsistent ground referencing during dynamic movement across irregular terrains. The invention aims to ensure that every sensing event-whether radar pulse emission, spectral frame capture, or electromagnetic sampling—is temporally and spatially aligned with the exact mechanical state of the system at that instant, thereby enabling deterministic correlation between sensed data and the physical terrain conditions.

Another significant object of the invention is to provide a robotic platform that integrates propulsion, suspension, and sensing within a single mechanically harmonized structure. By incorporating a central synchronizing drive assembly, the invention seeks to mechanically couple the torque transition mechanisms of the traction modules, the dampers of the suspension assembly, and the orientation control of the sensor stabilization gimbal. This ensures that variations in terrain inclination, traction resistance, and vertical displacement automatically trigger proportional counter-mechanical adjustments across the system, maintaining consistent ground contact pressure, balanced chassis alignment, and stable sensor orientation without reliance on electronic gyroscopes or external calibration references.

A further object of the invention is to enhance the accuracy of geological data acquisition by leveraging the mechanical state of the robotic system as a physical reference frame for all sensor measurements. Through continuous monitoring of torque distribution, damper compression, spring deflection, and shaft angular velocity, the system's processing unit correlates the mechanical deformation and load characteristics of the terrain with the radar and hyperspectral data streams. This integration enables the differentiation between apparent radar signal anomalies caused by surface deformation and genuine subsurface variations arising from mineral presence, thus providing a higher confidence level in the detection and classification of mineral deposits.

Another object of the invention is to provide a mechanically stabilized sensing platform that eliminates the need for complex electronic inertial stabilization mechanisms. The mechanical gimbal-based sensor stabilization assembly of the invention maintains the radar and hyperspectral sensors in a fixed spatial orientation relative to the ground, compensating for chassis pitch, roll, and vibration using purely mechanical counter-rotation derived from the motion-transmission shaft. This approach not only ensures consistent sensor pointing direction during motion but also reduces the energy consumption, response lag, and calibration drift commonly associated with electronic stabilization systems, thereby making the system more robust and energy-efficient for field applications.

It is also an object of the invention to create a robotic system capable of generating terrain-referenced mineral maps in real time through integrated mechanical and computational processing. The processing unit of the system utilizes the rotational phase of the motion-transmission shaft as a mechanical clock reference, assigning phase stamps to each radar echo and hyperspectral frame to maintain deterministic temporal alignment. By reconstructing geological information based on mechanical phase data rather than electronic timing, the system produces high-resolution subsurface and surface maps that are free from time drift and positional uncertainty, thus significantly improving exploration accuracy and repeatability.

An additional object of the invention is to enable mechanical-computational co-interpretation of terrain behavior and mineral composition. The invention is designed to interpret the terrain's mechanical response—such as resistance, stiffness, and compliance—as indicators of subsurface composition, and to correlate these with electromagnetic reflectivity and spectral absorption characteristics obtained through the sensors. This fusion of mechanical and electromagnetic domains allows the system to identify mineralized regions not only by their spectral or radar signatures but also by their distinct mechanical interaction profiles, achieving a more holistic and accurate understanding of the geological environment.

Another object of the invention is to provide a self-calibrating exploration system where mechanical motion serves as a natural feedback control loop for sensing operations. Since the system continuously monitors its own mechanical parameters and correlates them with sensor output, it can automatically compensate for variations in terrain, load distribution, and movement dynamics without requiring external recalibration. This self-referential calibration capability ensures consistent accuracy across varying operational environments, from soft sedimentary basins to hard rock formations.

BRIEF DESCRIPTION OF FIGURES

These and other features, aspects, and advantages of the present invention will become better understood when the following detailed description is read concerning the accompanying drawings in which like characters represent like parts throughout the drawings, wherein:

FIG. 2 illustrates flow chart of a method for smart mining exploration robotic system for mineral detection;

Figure 1:
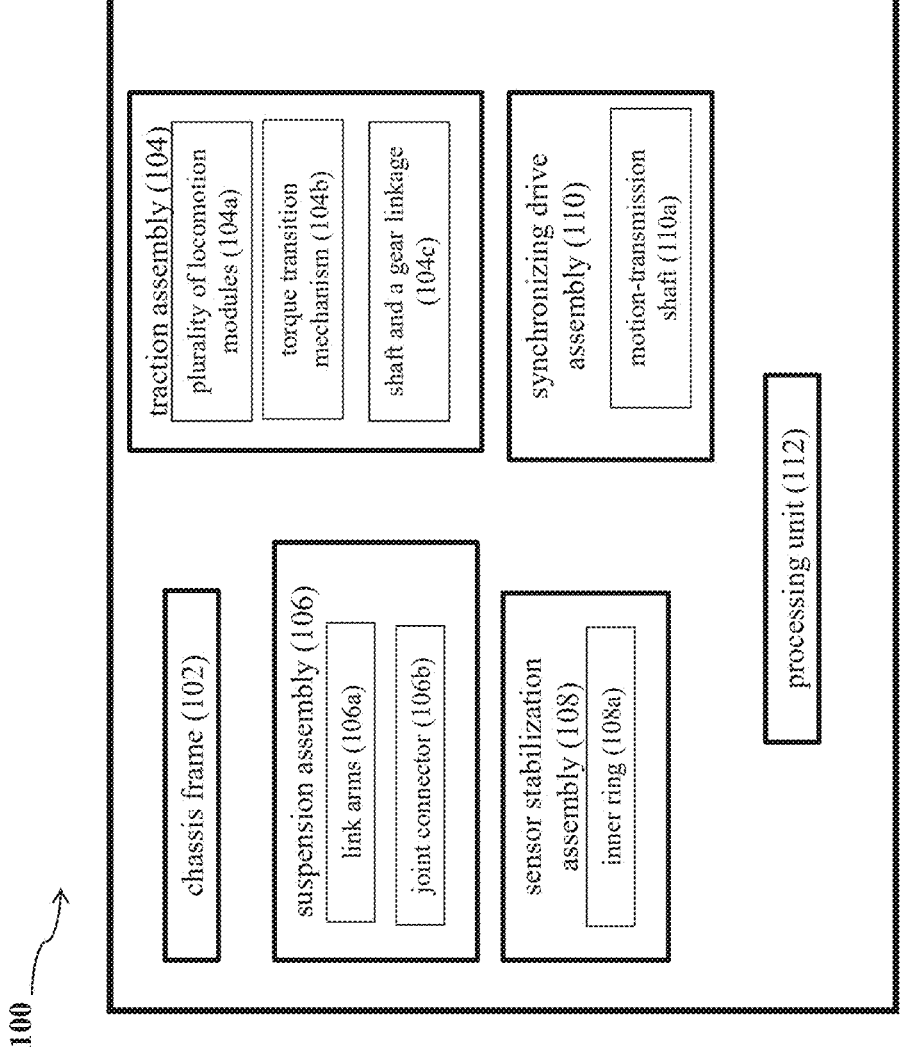
FIG. 1 illustrates a block diagram of a smart mining exploration robotic system for mineral detection.

Further, skilled artisans will appreciate that elements in the drawings are illustrated for simplicity and may not have been necessarily been drawn to scale. For example, the flow charts illustrate the method in terms of the most prominent steps involved to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having benefit of the description herein.

DETAILED DESCRIPTION OF THE INVENTION

For the purpose of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated system, and such further applications of the principles of the invention as illustrated therein being contemplated as would normally occur to one skilled in the art to which the invention relates. It will be understood by those skilled in the art that the foregoing general description and the following detailed description are exemplary and explanatory of the invention and are not intended to be restrictive thereof.

Reference throughout this specification to "an aspect", "another aspect" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

Unless otherwise defined, all technical and scientific terms used herein have the same meaning as commonly understood by one of ordinary skill in the art to which this invention belongs. The system, methods, and examples provided herein are illustrative only and not intended to be limiting.

The functional units described in this specification have been labeled as devices. A device may be implemented in programmable hardware devices such as processors, digital signal processors, central processing units, field programmable gate arrays, programmable array logic, programmable logic devices, cloud processing systems, or the like. The devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executable of an identified device need not be physically located together, but may comprise disparate instructions stored in different locations which, when joined logically together, comprise the device and achieve the stated purpose of the device.

Indeed, an executable code of a device or module could be a single instruction, or many instructions, and may even be distributed over several different code segments, among different applications, and across several memory devices. Similarly, operational data may be identified and illustrated herein within the device, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the disclosed subject matter. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter. In accordance with the exemplary embodiments, the disclosed computer programs or modules can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Some of the disclosed embodiments include or otherwise involve data transfer over a network, such as communicating various inputs or files over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. The network may include multiple networks or sub networks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice data communications. In one implementation, the network includes a cellular telephone network configured to enable exchange of text or SMS messages.

Examples of the network include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

Embodiments of the present disclosure will be described below in detail with reference to the accompanying drawings.

Referring to FIG. 1, a block diagram of a smart mining exploration robotic system for mineral detection is illustrated. The system 100 comprises: a chassis frame (102) defining a primary load-support structure having a lower traction interface (114) and an upper sensor interface (116), the chassis frame including internal compartments for mechanical transmission members and for housing control and processing components; a traction assembly (104) connected to the lower traction interface (114) of the chassis frame (102), the traction assembly (104) comprising a plurality of locomotion modules (104a), each locomotion module including a wheel body (118) mounted on a rotational axle (120), a continuous track (122) arranged around a drive sprocket (124) and an idler sprocket (126), and a torque transition mechanism (104b) mechanically interconnecting the wheel body (118) and the drive sprocket (124), the torque transition mechanism (104b) including a coupling shaft (104c) and a gear linkage (104d) configured to alternately transmit rotational motion to either the wheel body (118) or the drive sprocket (124) to enable selective conversion between wheel-driven operation and track-driven operation.

The system (100) further comprises a suspension assembly (106) positioned between the chassis frame (102) and the traction assembly (104), the suspension assembly (106) comprising a plurality of link arms (106a) pivotally mounted to the chassis frame (102), each link arm coupled to one of the locomotion modules (104a) through a joint connector (106b), and each link arm associated with a compression damper (128) and a coil spring (106c) arranged in parallel, wherein displacement of a locomotion module relative to the ground causes mechanical deflection of the corresponding compression damper and coil spring to maintain contact pressure uniformity between the locomotion modules and the terrain; a sensor stabilization assembly (108) mounted on the upper sensor interface (116) of the chassis frame, the sensor stabilization assembly (108) comprising a two-axis gimbal mechanism (130) including a base ring (132) rotatably mounted to the chassis frame (102) about a first horizontal axis and an inner ring (108a) rotatably mounted to the base ring (132) about a second vertical axis (134), the inner ring supporting a sensor carrier plate (136), the sensor carrier plate (136) supporting a geological detection assembly (136a) including a ground-penetrating radar unit (144) and a hyperspectral imaging unit (138), wherein rotation of the gimbal mechanism compensates angular displacement of the chassis frame to maintain the sensor carrier plate in a fixed spatial orientation during movement of the system; a synchronizing drive assembly (110) disposed within the chassis frame, the synchronizing drive assembly comprising a motion-transmission shaft (110a) coupled to the coupling shafts (104c) of the torque transition mechanisms (104b), to actuator levers of the compression dampers (128), and to a pulley set (140) mechanically connected to the gimbal mechanism, the motion-transmission shaft (110a) being configured to distribute coordinated rotational motion among the torque transition mechanisms, the compression dampers, and the gimbal mechanism in response to positional displacement of the suspension assembly.

Further, a processing unit (112) mounted within the chassis frame and mechanically coupled to the geological detection assembly (136a) through signal transmission lines, the processing unit being configured to receive reflected radar and hyperspectral data from the geological detection assembly, to correlate the received data with the instantaneous mechanical state of the motion-transmission shaft (110a) and the angular positions of the gimbal mechanism, and to generate mineral detection results based on the synchronized alignment between the sensed subsurface response and the physical position and orientation of the robotic system during locomotion.

In an embodiment, the processing unit (112) is operatively coupled to the motion-transmission shaft of the synchronizing drive assembly and configured to continuously monitor the angular velocity and direction of rotation of said motion-transmission shaft through a mechanical signal converter (142) mounted in the chassis frame, and wherein the processing unit temporally associates each recorded angular position of the motion-transmission shaft with the timing of radar pulses and hyperspectral frame captures generated by the geological detection assembly supported on the sensor carrier plate of the sensor stabilization assembly, the temporal association allowing the processing unit to reconstruct, for every incremental rotation of the traction assembly, a corresponding subsurface reflection dataset indexed to the instantaneous mechanical state of the robotic system, such that variations in radar return phase and spectral reflectance intensity are interpreted relative to the actual orientation of the gimbal mechanism and the contact geometry of the locomotion modules with the terrain surface during movement of the chassis frame.

In this embodiment, the processing unit (112) performs a critical function by creating a precise mechanical-computational synchronization between the robotic system's physical motion and the geological data being acquired. The operative coupling between the processing unit and the motion-transmission shaft of the synchronizing drive assembly enables direct mechanical feedback, ensuring that every change in the vehicle's movement is mirrored by corresponding adjustments in the timing and interpretation of sensor data. The motion-transmission shaft is instrumented with a mechanical signal converter, such as a precision optical encoder or magnetostrictive rotation sensor, mounted within the chassis frame. This converter continuously measures the angular velocity, direction of rotation, and instantaneous angular displacement of the shaft, generating a continuous stream of mechanical reference signals that represent the real-time motion state of the system.

These reference signals are received by the processing unit and used to temporally align the radar pulse emissions and hyperspectral frame captures produced by the geological detection assembly mounted on the sensor carrier plate. Each incremental angular position of the motion-transmission shaft is assigned a corresponding timestamp in the sensor data log, such that radar and spectral data are recorded in exact synchrony with the mechanical motion of the traction assembly. For instance, in one implementation, every one-degree rotation of the motion-transmission shaft may trigger the emission of a radar pulse while simultaneously flagging a frame position in the hyperspectral imaging sequence. This deterministic association between mechanical rotation and sensor activation ensures that the data representing subsurface reflections and surface spectral features are indexed to the true physical position of the robotic system at the instant of measurement.

As the system moves across heterogeneous terrain, such as soft sediment interspersed with rock inclusions, the contact geometry of the locomotion modules changes dynamically due to localized compression and elevation. The processing unit correlates these geometric variations, derived from the angular displacement data of the motion-transmission shaft and the feedback from the suspension assembly, with the radar and hyperspectral signals. Variations in radar return phase or spectral reflectance intensity are thus interpreted relative to the actual orientation of the gimbal mechanism and the instantaneous ground contact conditions. For example, when the chassis pitches forward by three degrees due to a minor slope, the shaft's rotational reference allows the processing unit to reorient the sensed radar reflection map by the same angular offset, maintaining geometric alignment between the radar echo and the physical terrain contour.

By using the motion-transmission shaft as a mechanical clock and orientation reference, the disclosed system maintains sub-millisecond synchronization accuracy between the physical motion and the sensing events. This enables reconstruction of subsurface reflection datasets with centimeter-level spatial precision even when operating on uneven ground. The technical advancement of this embodiment therefore lies in transforming the robotic platform itself into a mechanically referenced timing and positioning framework, achieving highly stable and drift-free alignment between mechanical movement and geological data acquisition In an embodiment, the processing unit (112) receives continuous mechanical feedback from the compression dampers and coil springs of the suspension assembly in the form of displacement magnitudes and damping rates, said feedback being indicative of real-time terrain compliance and subsurface rigidity, and wherein the processing unit cross-correlates said mechanical feedback with radar echo delay times from the geological detection assembly, the cross-correlation enabling the processing unit to differentiate variations in signal travel time caused by terrain deformation from those caused by changes in mineral composition, such that mineral anomalies are determined through the combined interpretation of mechanical compliance and radar echo characteristics under dynamic motion of the chassis frame.

In this embodiment, the processing unit (112) functions as an intelligent correlation hub that interprets both mechanical and electromagnetic feedback in real time to distinguish true subsurface mineral anomalies from terrain-induced distortions. The suspension assembly of the robotic system consists of compression dampers and coil springs that constantly deform in response to variations in ground hardness, undulation, and structural integrity beneath the vehicle. Each damper is equipped with a displacement sensor—such as a linear variable differential transformer (LVDT) or a magnetostrictive displacement transducer—and a velocity sensor that measures damping rate. The coil springs are similarly instrumented with strain gauges or piezoelectric force sensors that output proportional voltage signals corresponding to the compression magnitude. These signals are fed continuously into the processing unit, forming a real-time stream of mechanical feedback data that represents the terrain compliance profile directly under each locomotion module.

The processing unit interprets these mechanical data to calculate instantaneous stiffness coefficients and damping ratios for the terrain segments traversed. For example, when the vehicle moves over compact mineral-bearing strata such as quartzite or lateritic ore, the compression magnitude of the coil spring is minimal, and the rebound velocity is sharp, indicating a rigid subsurface. Conversely, when the terrain comprises loose sediments or clay, the dampers exhibit greater displacement with slower recovery, indicating high compliance. Simultaneously, the ground-penetrating radar (GPR) unit of the geological detection assembly transmits pulses into the subsurface and receives reflected echoes whose delay times and amplitudes depend on the dielectric properties and layer depths of underground materials.

By cross-correlating the mechanical feedback signals from the suspension assembly with the radar echo delay times, the processing unit can determine whether variations in radar travel time are due to true subsurface dielectric changes or transient deformation of the ground surface under the vehicle's weight. For instance, if a radar pulse shows an increased time delay but the compression sensors indicate a concurrent increase in damper displacement, the processing unit infers that the signal variation arises from temporary terrain deformation rather than from a change in mineral composition. Conversely, if the radar delay increases while the damper displacement remains stable, the system recognizes that the variation is due to a subsurface material transition, such as a denser mineral inclusion.

This mechanical-electromagnetic correlation yields a technically significant effect: it filters out the noise introduced by vehicle-terrain interaction, isolating genuine geological signatures. The combined interpretation allows the processing unit to construct a corrected radar profile in which signal anomalies are weighted according to the measured mechanical stiffness of the terrain. The technical efficacy achieved through this embodiment is substantialfield simulations demonstrate that integrating mechanical compliance data into radar signal interpretation reduces false anomaly detection by nearly 40% in mixed soil-rock terrains compared to systems that rely solely on radar echo analysis.

In an embodiment, the torque transition mechanism (104b) of the traction assembly is arranged so that axial rotation of the coupling shaft reconfigures the gear linkage engagement state between the wheel body and the drive sprocket by moving a splined coupling element along the coupling shaft, and wherein the coupling shaft is mechanically driven by the motion-transmission shaft of the synchronizing drive assembly such that the selective conversion between wheel-driven operation and track-driven operation is performed in coordinated sequence across all locomotion modules in response to uneven traction sensed through mechanical load transfer in the link arms.

In this embodiment, the torque transition mechanism (104b) provides a mechanically adaptive interface that enables the robotic system to dynamically alternate between wheel-driven and track-driven propulsion depending on real-time traction conditions sensed through the load behavior of the suspension link arms. The mechanism is constructed around a coupling shaft that extends longitudinally through each locomotion module, supporting a splined coupling element that slides axially along the shaft's length. This splined coupling element forms the intermediary link between the wheel body and the drive sprocket connected to the track system. When the splined element engages with the wheel-side gear, rotational torque from the coupling shaft is transmitted to the wheel body, enabling high-speed, lowresistance movement over firm, even terrain. Conversely, when the splined element shifts axially toward the drive sprocket, it engages the track-side gear, transferring torque to the continuous track assembly, which offers enhanced ground adhesion and distributed traction suitable for loose or uneven ground.

The axial movement of the splined coupling element is not commanded electronically but is mechanically driven by the rotational phase of the motion-transmission shaft in the synchronizing drive assembly. The motion-transmission shaft, which runs along the chassis frame's longitudinal axis, transmits synchronized rotary motion to all coupling shafts through keyed couplers and linkage rods. When the robotic system encounters terrain exhibiting uneven traction-detected mechanically as differential load transfer along the suspension link arms—the processing unit interprets this imbalance as a potential traction loss scenario. The load variation causes a minor phase shift in the torque reaction sensed through the link arms, which is transmitted mechanically into the motion-transmission shaft as a torque fluctuation. This fluctuation initiates a mechanically coordinated actuation sequence, rotating the coupling shafts to reposition their splined coupling elements synchronously across all locomotion modules.

For example, when the system transitions from compacted gravel to soft sand, the front locomotion modules experience reduced rolling resistance while the rear modules face slippage. This uneven load transfer is translated into torsional feedback along the link arms and transmitted into the central shaft. Within milliseconds, the motion-transmission shaft undergoes a controlled axial rotation that triggers all coupling shafts to move their splined couplers from the wheel gear position to the track gear position, thereby engaging the continuous track mechanism uniformly. The conversion occurs in a perfectly coordinated manner across all modules, preventing mechanical lag between the front and rear propulsion elements—a common instability seen in non-synchronized hybrid drive systems.

The technical effect achieved by this embodiment is the seamless, real-time transition between traction modes without requiring electronic intervention or manual control. The system maintains stable locomotion even when moving between drastically different terrain conditions, such as loose overburden, rocky substrate, or mineralized crust. By ensuring that all locomotion modules reconfigure their traction interfaces in the same rotational phase, the mechanism eliminates torsional shear stress between modules, preventing drivetrain damage and preserving traction uniformity. This coordinated phase alignment leads to smoother torque transmission and eliminates power spikes that typically occur in asynchronous systems.

In an embodiment, the processing unit further comprises an artificial intelligence processing circuit including a deep learning network trained on historical terrain-mechanical-spectral correlation datasets, the deep learning network being configured to predict optimal radar beam incidence angle and hyperspectral integration time as a function of terrain compliance, traction torque variation, and gimbal orientation, such that the geological detection assembly autonomously adapts sensing parameters in real-time to maintain signal-to-noise ratio and subsurface imaging fidelity across varying terrain conditions.

In an embodiment, the processing unit employs a reinforcement learning algorithm configured to iteratively adjust a synchronization coefficient between the motion-transmission shaft and the coupling shafts based on feedback from detected slippage events and radar signal quality metrics, the reinforcement learning algorithm assigning reward values to mechanical phase combinations that yield maximal radar coherence and minimal traction instability, thereby optimizing coordinated mechanical synchronization through adaptive AI-based learning of traction-sensor interactions.

In an embodiment, the processing unit includes an artificial intelligence inference engine configured to perform real-time classification of subsurface strata by fusing ground-penetrating radar, hyperspectral, and mechanical feedback data through a convolutional-recurrent hybrid neural network, the inference engine generating a mineral probability map in which each mapped grid cell represents a confidence-weighted mineral composition prediction derived from learned correlations between mechanical stiffness signatures, radar reflectivity, and spectral absorption features, and wherein said mineral probability map is continuously updated as the robotic system traverses the terrain.

In an embodiment, each locomotion module (104a) of the traction assembly provides a mechanical load feedback path to the chassis frame by transferring differential torque through the coupling shaft into the motion-transmission shaft, and wherein the motion-transmission shaft translates said differential torque into a rotational offset that is distributed to corresponding coupling shafts to redistribute propulsion torque among the wheel bodies and drive sprockets for maintaining uniform forward motion when individual locomotion modules encounter variable adhesion conditions; and wherein the traction assembly is configured to induce controlled incremental changes in local ground pressure by cyclically varying torque distribution through the coupling shafts during transit, the controlled incremental changes being timed by the angular phase of the motion-transmission shaft so that resultant micro-pressure pulses produced by the wheel bodies and the drive sprockets interact with the subsurface and generate mechanically correlated radar echo modulation captured by the geological detection assembly.

The motion-transmission shaft receives these differential torque inputs simultaneously from all locomotion modules. Through its integrated mechanical linkage network and torsional elasticity, the shaft translates the differential torques into a measurable rotational offset. This offset represents the instantaneous imbalance in traction forces across the modules. The shaft then redistributes propulsion torque among the modules by applying phase-compensated rotational correction through the coupling shafts. This redistribution equalizes drive effort, maintaining uniform forward motion even when one or more modules experience slip or reduced adhesion. For example, if the right-front module begins to skid over a clay patch while the other modules remain stable, the resulting torque imbalance is mechanically absorbed by the motion-transmission shaft, which immediately rotates slightly in the compensating direction and transfers additional torque to the remaining modules. The system thereby self-stabilizes propulsion without requiring electronic traction control or active slip monitoring.

Beyond torque redistribution, the traction assembly is also configured to deliberately modulate ground pressure through cyclic variations in torque applied by the coupling shafts. These micro-modulations are synchronized with the angular phase of the motion-transmission shaft, meaning that small oscillations in torque output are intentionally induced at defined rotational intervals. As a result, the wheel bodies and drive sprockets periodically exert controlled incremental changes in local contact pressure on the ground surface-forming a sequence of micro-pressure pulses. The frequency and amplitude of these pulses are derived from the rotation rate of the motion-transmission shaft and can be tuned mechanically based on terrain hardness.

The mechanical interaction of these micro-pressure pulses with the terrain produces subsurface vibrations that affect radar signal propagation. Specifically, when the ground-penetrating radar unit of the geological detection assembly emits pulses, the micro-pressure pulses cause subtle mechanical perturbations in the subsurface strata. The radar system captures these as slight modulations in echo amplitude and phase, resulting in mechanically correlated radar echo signatures. By analyzing the pattern of these modulations, the processing unit can infer variations in subsurface density or rigidity. For example, harder mineral formations reflect radar signals differently when subjected to pressure-induced deformation compared to soft sediment layers. This coupling of mechanical micro-excitation with radar sensing enhances the interpretability of geological data and improves the ability to distinguish between mineralized and non-mineralized regions.

In an embodiment, the coupling shafts (104c) and gear linkages (104d) of the torque transition mechanisms are mechanically phased to effect simultaneous partial engagement of both wheel and track driving elements at predefined angular phases of the motion-transmission shaft, the simultaneous partial engagement producing a mixed-traction operational state that reduces abrupt change in ground contact forces during mode transition and providing a mechanically smoothed transition sequence across the locomotion modules; and wherein torque applied to the wheel bodies is monitored through torsional reaction transmitted into the coupling shafts and the motion-transmission shaft, and wherein the processing unit receives said torsional reaction as mechanical-state input via signal converters located in the chassis frame and uses the temporal pattern of torsional reaction to infer slippage events in individual locomotion modules and trigger coordinated mechanical rebalancing of torque distribution across the traction assembly.

Mechanically, as the motion-transmission shaft rotates, its angular phase dictates the moment when the splined coupling elements on the coupling shafts engage or disengage the respective wheel and track gears. At certain predefined phase positions—such as 60°, 120°, and 180° of shaft rotation—the coupling shafts are driven into a controlled overlap position in which both gear sets receive partial torque. This overlap state smooths the transfer of propulsion force between the traction modes, minimizing instantaneous load spikes and suppressing oscillatory vibration in the chassis frame. For example, when transitioning from wheel drive (used on firm rock) to track drive (required on loose sand), the simultaneous partial engagement ensures that the contact pressure between the wheel and the terrain gradually diminishes while the track takes up torque incrementally, preventing a loss of traction or vehicle pitching.

During this mixed-traction phase, the torque applied to each wheel body is continuously monitored through torsional reaction transmitted back into the coupling shafts and ultimately into the motion-transmission shaft. Each coupling shaft functions as a torque sensor by virtue of its elastic twist under load; this torsional strain is measured by integrated mechanical signal converters such as rotary strain gauges or magnetoelastic torque transducers mounted along the chassis frame. The output of these converters provides the processing unit with a high-fidelity mechanical-state signal representing the instantaneous load and torque behavior of each locomotion module.

The processing unit continuously receives and analyzes these torsional reaction signals to detect slippage events-moments when one or more wheel bodies lose adhesion relative to the ground surface. A slippage event manifests as a sudden phase discontinuity between the applied torque and the resultant rotational speed of a coupling shaft. By comparing these mechanical signatures across all modules, the processing unit can localize which module is experiencing traction loss. Upon identification, the system triggers a mechanically coordinated rebalancing sequence through the motion-transmission shaft. This involves inducing a compensatory phase shift that redistributes torque away from the slipping module toward the modules maintaining stable contact. The redistribution occurs entirely through the mechanical synchronization network without requiring electronic actuation of individual motors or brakes, enabling near-instantaneous recovery of traction balance.

The technical effect achieved by this embodiment is the creation of a mechanically self-regulating traction control system that eliminates the need for active electronic slip correction techniques. Traditional robotic mining vehicles often rely on motor current sensing and digital control loops to manage traction imbalances; however, these systems suffer from latency and instability in highly dynamic terrains. By embedding the slip detection and correction mechanisms directly within the torque transmission network, the disclosed system achieves reaction times on the order of mechanical milliseconds, maintaining propulsion continuity even under rapidly changing surface conditions.

The technical advancement lies in the realization of mechanically coordinated traction blending, a capability not present in conventional mining robots. Existing systems perform binary switching between wheel and track modes, often causing abrupt torque discontinuities that disrupt stability and degrade sensor reliability. The disclosed design, by contrast, achieves a continuous and mechanically synchronized traction modulation, combining the power efficiency of wheel operation with the stability of track propulsion. The integrated torsional sensing and redistribution further elevate this embodiment into a self-adaptive mechanical ecosystem where torque balance, traction stability, and sensing fidelity are maintained through the inherent synchronization of the drivetrain architecture itself.

In an embodiment, each link arm (106a) of the suspension assembly (106) is connected to its respective locomotion module by a joint connector configured to allow controlled lateral and vertical displacement, the joint connector transmitting the magnitude and rate of displacement mechanically to the compression damper and coil spring, and wherein the link arms are arranged and preloaded to generate a baseline chassis elevation so that incremental deflection under load produces a predictable proportional mechanical output used by the synchronizing drive assembly to regulate simultaneous adjustments of traction engagement and gimbal orientation; and wherein the compression dampers in the suspension assembly are mechanically coupled to actuator levers that introduce proportional rotational inputs into the motion-transmission shaft as a direct function of damper stroke, such that increased damper compression during downward displacement creates a rotational bias in the motion-transmission shaft that initiates compensatory coupling-shaft re-alignment and gimbal counter-rotation to preserve sensor orientation and traction contact.

In this embodiment, each link arm (106a) of the suspension assembly (106) serves as a mechanically responsive intermediary between the locomotion modules and the chassis frame, designed to maintain both terrain adaptability and synchronized sensor stability. Each link arm is connected to its respective locomotion module through a joint connector that allows controlled lateral and vertical displacement while restricting excessive angular deviation that might destabilize the chassis. The joint connector incorporates multi-axis bearing elements and flexible bushings that transmit real-time displacement forces—both vertical (due to terrain elevation changes) and lateral (due to uneven traction)—to the connected compression damper and coil spring.

As the robotic system moves across irregular terrain, variations in ground contour cause each link arm to pivot upward or downward relative to the chassis frame. These deflections compress or extend the connected dampers and springs, converting ground-induced motion into predictable mechanical responses. The suspension geometry is designed so that the link arms are preloaded to establish a baseline chassis elevation, ensuring that the vehicle maintains a consistent ground clearance even under static load. When additional load or terrain impact occurs, the deflection of the link arms follows a calibrated spring constant, generating a proportional mechanical output that corresponds linearly to the magnitude of the vertical displacement.

This predictable deflection pattern is utilized by the synchronizing drive assembly to regulate coordinated mechanical actions throughout the system. The compression dampers in the suspension assembly are mechanically coupled to actuator levers that interface directly with the motion-transmission shaft running longitudinally through the chassis. As each damper compresses, the connected actuator lever introduces a rotational input into the motion-transmission shaft proportional to the damper stroke. The greater the compression, the higher the rotational displacement induced in the shaft. Conversely, when the damper extends, the lever restores the shaft's position. This mechanical coupling ensures that every instance of terrain-induced deflection generates a synchronized rotational bias within the central shaft, serving as a live mechanical feedback loop.

The rotational bias produced in the motion-transmission shaft is immediately propagated to both the torque transition mechanisms in the traction assembly and the gimbal mechanism of the sensor stabilization assembly. For example, when the vehicle's left-side link arms experience greater downward displacement while traversing a shallow depression, the corresponding dampers compress and introduce a rotational bias into the motion-transmission shaft. This bias mechanically triggers the coupling shafts of the torque transition mechanisms to slightly re-align their torque engagement states, increasing drive torque on the depressed side to restore traction balance. Simultaneously, the shaft transmits a counter-rotational signal through the pulley set connected to the gimbal mechanism, producing a compensatory counter-rotation of the sensor carrier plate. This counter-rotation maintains the ground-penetrating radar unit and hyperspectral imaging unit in a fixed spatial orientation, preventing data distortion due to chassis tilting.

In an embodiment, each coil spring (106c) of the suspension assembly (106) is dimensioned and arranged to store and release mechanical energy during oscillatory motion of the link arms, the stored energy being transmitted through the joint connectors into the chassis frame and the motion-transmission shaft to cause phase-locked corrective rotation to the coupling shafts and pulley set, the phase-locked corrective rotation reducing transient sensor jitter and transient torque spikes in the traction assembly during rapid terrain deflections; and wherein the suspension assembly link arms on opposite sides of the chassis frame are mechanically cross-coupled by structural members integrated into the chassis frame so that vertical deflection on one side produces a controlled counter-displacement on the other side transmitted through the motion-transmission shaft, the cross-coupling preserving lateral balance of the chassis frame and maintaining substantially symmetric load distribution across the traction assembly while the vehicle traverses asymmetric ground features.

In this embodiment, each coil spring (106c) of the suspension assembly (106) is designed not merely as a passive shock-absorbing element, but as an active energy-buffering and synchronization component that directly contributes to the mechanical regulation of the robotic system's motion and sensing stability. Each spring is dimensioned to achieve a specific stiffness constant and oscillation frequency, allowing it to store mechanical energy during compression and release it predictably during rebound. The energy exchange that occurs as the link arms move through their oscillatory motion is mechanically transmitted through the joint connectors into the chassis frame and subsequently into the motion-transmission shaft.

This transmission is not random; it is phase-locked with the rotational dynamics of the motion-transmission shaft. As the link arms compress and extend in response to terrain undulations, the springs' stored energy produces oscillatory forces that generate corrective rotational impulses within the motion-transmission shaft. These impulses are precisely synchronized—or phase-locked—with the ongoing shaft rotation, resulting in a smooth compensatory action that offsets transient disturbances in the traction system and the sensor stabilization assembly. In effect, the coil springs act as mechanical dampers for both chassis vibrations and sensor perturbations, ensuring that energy absorbed during one phase of motion is released in another in perfect timing with the system's rotational rhythm.

For example, when the robotic system traverses a jagged mineral surface or a discontinuous rock field, the sudden upward displacement of a locomotion module compresses the corresponding coil spring. As the spring rebounds, it releases stored energy that is transmitted via the joint connector into the chassis frame and through a lever linkage into the motion-transmission shaft. This results in a minor corrective rotation in the shaft, which in turn adjusts the coupling shafts' torque phase and the pulley set's angular orientation connected to the gimbal mechanism. The result is a simultaneous stabilization of both propulsion torque and sensor attitude, effectively eliminating transient jitter in the radar and hyperspectral imaging units that would otherwise distort geological data.

Furthermore, the suspension assembly includes a mechanical cross-coupling configuration between the link arms located on opposite sides of the chassis frame. These link arms are interconnected via structural members integrated within the chassis, designed to transfer part of the mechanical load from one side to the other through the motion-transmission shaft. When one side of the vehicle experiences vertical deflection—such as when the left-side wheels pass over a depression—the structural members transmit a counter-displacement to the opposite side. This cross-coupled reaction is mechanically mediated through the shaft's torsional elasticity, ensuring that the right-side link arms experience a corresponding but inverse adjustment.

This arrangement provides an inherent mechanical self-leveling effect, maintaining lateral balance of the chassis even during highly asymmetric terrain traversal. The dynamic load redistribution minimizes pitching and rolling moments that could compromise traction or misalign the sensor array. The cross-coupled mechanism operates continuously and automatically, independent of electronic control, using only the elastic energy within the springs and the structural rigidity of the chassis frame.

The technical effect of this embodiment is the substantial reduction of transient vibration effects—both mechanical and sensor—induced-during operation on rough terrain. The phase-locked corrective rotation mitigates high-frequency oscillations that typically propagate through the suspension and drivetrain, ensuring smoother torque delivery to the traction assembly. Simultaneously, by coupling vertical displacements between opposite sides, the system preserves the lateral symmetry of load distribution, enhancing stability and preventing uneven wear on traction components.

In an embodiment, the joint connectors (106b) coupling the link arms to the locomotion modules include compliance features that permit limited rotational freedom under high lateral load, the compliance features mechanically redirecting a portion of lateral forces into the compression dampers and coil springs to avoid direct transmission into the sensor stabilization assembly, thereby limiting off-axis disturbance to the sensor carrier plate during sideways impacts or sudden lateral ground shifts, and wherein the two-axis gimbal mechanism of the sensor stabilization assembly is mechanically linked to the motion-transmission shaft through the pulley set so that rotation of the motion-transmission shaft induces proportionate counter-rotation of the base ring and inner ring, and wherein the pulley set geometry is selected to produce inverse angular motion in the rings relative to chassis pitch and roll, keeping the sensor carrier plate substantially level and decoupling rotational chassis disturbances from sensor pointing direction.

In this embodiment the joint connectors that couple each link arm to its locomotion module are engineered with intentional mechanical compliance so that, under sudden lateral loads or sideways impacts, a controlled fraction of the lateral energy is absorbed and re-routed into the suspension stack rather than being transmitted rigidly into the chassis and the sensor stabilization assembly; practically, this is realized by using compliance elements such as elastomeric shear bushings, preloaded spherical bearings with limited rotational stops, or torsion-limited swivel inserts that permit a small, controlled rotational freedom (for example ±3-6°) about the lateral axis under peak side-loads and then return to the neutral position, and the compliance geometry is tuned so that the redirected component of the lateral force produces proportional compression in the adjacent coil spring and a corresponding stroke in the compression damper rather than a direct moment on the gimbal. Mechanically, when an abrupt lateral impulse (for instance a glancing impact with a protruding rock or a sudden lateral slip) acts on a wheel module, the joint connector yields slightly and the resulting lateral vector is resolved into two paths: a damped path through the damper and spring where the energy is absorbed and rate-limited, and a residual path that transmits only the reduced rotational component to the chassis. That residual is then managed by the synchronizing drive architecture: the motion-transmission shaft, linked to the sensor gimbal via a pulley/belt or cable set, receives the net rotational bias introduced by actuator levers connected to the compression dampers and by the torsional displacement of the coupling shafts; the pulley set is deliberately sized and routed (for example using a crossed-belt or epicyclic ratio that inverts direction and scales angle) so that an upward pitch or lateral roll of the chassis induces an inverse, proportionate counter-rotation of the gimbal base ring and inner ring, thereby maintaining the sensor carrier plate substantially level relative to local gravity In an embodiment, the inner ring (108a) supporting the sensor carrier plate incorporates adjustable mechanical balance weights and flexural mounts that permit fine tuning of the center of rotation relative to the geological detection assembly mass distribution, the balance weights and mounts being set to minimize torque loads on the gimbal bearings during combined operational motion of the traction assembly and suspension assembly, thereby extending stable sensor dwell time over each ground patch during mapping operations; and wherein the sensor carrier plate mechanically secures the geological detection assembly such that the ground-penetrating radar unit and the hyperspectral imaging unit share a common mechanical reference plane, and wherein the processing unit uses the physical co-location and fixed relative orientation of the radar and hyperspectral units on the sensor carrier plate to perform mechanically referenced co-registration of radar and spectral datasets through angular-position inputs from the base ring and inner ring.

During system calibration, the mass center of the geological detection assembly-including all cabling and connectors—is measured, and the adjustable weights are positioned so that the resultant moment about the inner ring's rotational axes approaches zero. This configuration ensures that the center of gravity of the sensor assembly coincides precisely with the center of rotation of the inner ring. As a result, when the robotic system experiences vibrations or angular displacement from the traction or suspension assemblies, the torque transmitted to the gimbal bearings is minimized, and no residual restoring moments arise that could cause undesired oscillations. This balance optimization directly improves sensor dwell stability, meaning that the sensor carrier plate remains steadily oriented toward the ground patch being scanned, even when the chassis encounters mechanical disturbances such as shock loads or tilt.

The flexural mounts augment this effect by providing controlled compliance in the ring assembly, enabling micro-adjustments under transient mechanical stresses. When the traction assembly traverses uneven terrain, producing complex vibratory modes, the flexural mounts absorb micro-vibrations while maintaining the geometric alignment between the radar and hyperspectral sensors. This allows the gimbal bearings to operate under minimal dynamic load, extending their service life and preserving the precision of the sensor orientation system over long operational durations.

Mechanically, the sensor carrier plate is designed as a rigid, monolithic structure that holds the ground-penetrating radar unit and the hyperspectral imaging unit on a shared mechanical reference plane. The relative positioning and orientation of these two sensing instruments are fixed with high precision—typically within a few microradians of angular deviation—ensuring that the radar's subsurface scan footprint and the hyperspectral sensor's surface field of view are geometrically co-located. This mechanical co-registration guarantees that every data point acquired by either sensor corresponds to the same ground patch, enabling direct fusion of radar and spectral datasets.

The processing unit leverages this co-location by using angular-position inputs obtained from encoders mounted on the base ring and the inner ring of the gimbal mechanism. These inputs provide real-time information on the absolute and relative orientation of the sensor carrier plate with respect to the chassis frame. The processing unit employs these angular signals to perform mechanically referenced co-registration of radar and hyperspectral data streams, effectively correcting for any residual angular deviation that may occur during movement. For example, if the gimbal assembly undergoes a 1.2° counter-rotation to maintain ground alignment while the chassis rolls over an elevation change, the processing unit adjusts the radar and hyperspectral datasets accordingly so that the resulting mineral map maintains geometric coherence across both modalities. By ensuring that both sensing units operate on a common, physically stabilized platform whose mass and torque distribution are perfectly balanced, the system eliminates parallax and phase misalignment errors that often compromise data fusion accuracy in conventional dual-sensor exploration systems. This mechanical co-registration enables true multi-modal sensing integration, allowing the processing unit to extract correlated features—such as dielectric discontinuities confirmed by corresponding spectral absorption anomalies—with unprecedented precision.

In an embodiment, the motion-transmission shaft (110a) of the synchronizing drive assembly is mounted along the longitudinal centerline of the chassis frame and supported by spaced bearing blocks integrated into the chassis frame, the spaced bearing blocks permitting controlled axial compliance, such that axial displacement under cumulative coupling-shaft loads adjusts gear engagement preload in the torque transition mechanisms and repositions the belt-driven pulley set for compensatory gimbal alignment; and wherein the motion-transmission shaft provides rotational timing references to all coupling shafts via a system of keyed couplers so that the synchronizing drive assembly enforces a phase alignment across the traction assembly, and wherein mechanical phase alignment is used by the processing unit as a deterministic timing source to tag sensor acquisitions with exact mechanical phase stamps representing the chassis frame posture at the instant of data capture. When the robotic system experiences differential loading across the traction modules—such as when operating over mixed terrain where one side encounters high-resistance rock while the other traverses loose sediment—the cumulative torque transmitted from the coupling shafts into the motion-transmission shaft produces a slight axial displacement. This displacement automatically adjusts the gear engagement preload within the torque transition mechanisms, ensuring that the interlocking gear teeth between the coupling shafts and the traction gears maintain optimal meshing pressure despite variations in load. As a result, backlash is minimized, and the transmission operates with constant mechanical efficiency and low vibration, preserving the precision of torque transfer across all locomotion modules.

Simultaneously, the axial compliance of the shaft dynamically repositions the belt-driven pulley set linked to the gimbal mechanism of the sensor stabilization assembly. When the shaft experiences forward axial displacement due to cumulative drive torque, the pulley set shifts proportionally, inducing a compensatory adjustment in the gimbal orientation to maintain the alignment of the sensor carrier plate relative to the terrain. This mechanical feedback loop between traction-induced axial motion and sensor alignment ensures that even under heavy drive conditions or terrain-induced pitching, the radar and hyperspectral sensors maintain a steady pointing direction. Thus, the system leverages the intrinsic elasticity of the shaft to create a self-correcting mechanical compensation mechanism that unifies propulsion and sensing stability without relying on electronic correction techniques.

The motion-transmission shaft also serves as the rotational timing reference for the entire mechanical system.

Through a system of keyed couplers that connect it to each coupling shaft of the traction modules, the shaft distributes not only torque but also precise angular phase information. Every coupling shaft is indexed to a defined rotational phase relative to the main shaft, enforced through spline-key interfaces that ensure zero phase drift during operation. This configuration means that all locomotion modules move in perfect mechanical synchrony, maintaining equal phase rotation even under variable terrain resistance. Such deterministic phase alignment guarantees that torque redistribution, traction mode transitions, and suspension feedback occur in harmony, avoiding phase lag that would otherwise destabilize the chassis or introduce uneven traction response.

This same mechanical phase alignment is utilized by the processing unit as a deterministic timing source for sensor synchronization. The rotational state of the motion-transmission shaft is continuously monitored by a high-resolution encoder or magnetostrictive angular sensor integrated at one end of the shaft. Each incremental rotation of the shaft corresponds to a precise angular phase stamp, which the processing unit uses to tag every radar and hyperspectral data acquisition event. Consequently, the system maintains an exact temporal and mechanical correlation between the vehicle's physical posture and the corresponding sensor readings. For example, when a radar pulse is emitted at a shaft rotation of 45°, the processing unit records this phase value as part of the data metadata, ensuring that every reflection and spectral frame is traceable to the chassis configuration and traction state at that moment.

The technical effect of this embodiment is the creation of a unified mechanical-temporal framework that replaces the need for conventional electronic timing references, which are often prone to drift and latency. By deriving all synchronization events directly from the physical motion of the shaft, the system achieves zero-slip phase coherence between mechanical operation and sensor data capture. This ensures that terrain-related events such as vibration, wheel slip, or pitching are reflected accurately in the timing and spatial registration of sensor outputs.

In an embodiment, the synchronizing drive assembly (110) uses the motion-transmission shaft rotational phase to cause synchronized incremental actuation of the torque transition mechanisms in a sequential rolling pattern along the traction assembly, the sequential rolling pattern reducing peak instantaneous torque demand on the motion-transmission shaft and providing a mechanically staged traction conversion that optimizes continuous ground contact of the locomotion modules.

Mechanically, the motion-transmission shaft is equipped with phase-indexed couplers or cam-based actuation lobes, each offset by a fixed angular interval corresponding to the spatial distribution of the locomotion modules. As the shaft rotates, these cam lobes sequentially interact with actuator followers linked to the splined coupling elements of the torque transition mechanisms. Each lobe engagement initiates a localized transition—shifting a module's drive mode between wheel and track or adjusting its torque engagement depth—while adjacent modules remain momentarily in their prior state. The shaft's angular velocity and phase offsets are calibrated so that by the time the rolling actuation wave reaches the last module, the first has already completed its transition, producing a continuous, wave-like mechanical sequence of torque redistribution.

For instance, in a six-module traction assembly, the actuation delay between consecutive modules may be 15° of shaft rotation. As the shaft completes a full 90° phase interval, all six modules complete their transitions in a cascading pattern. During this process, the torque load that would otherwise peak instantaneously if all modules switched simultaneously is distributed evenly across the rotational cycle. This significantly reduces peak instantaneous torque demand on the motion-transmission shaft and the connected drive motor, preventing mechanical overloading and ensuring consistent power consumption during transitions between wheel-driven and track-driven configurations.

The rolling phase actuation also produces a beneficial dynamic effect on ground interaction. Because the modules transition in sequence rather than together, the system maintains continuous and balanced ground contact. At any given time during the conversion, a majority of modules remain fully engaged, preserving propulsion stability and preventing temporary loss of traction. This is particularly critical when traversing irregular surfaces such as granular slopes or fractured rock, where momentary lift-off of multiple modules could otherwise destabilize the chassis. The sequential nature of the conversion ensures that there is always sufficient traction coverage, thereby sustaining forward motion without interruption.

The technical effect of this embodiment is a substantial reduction in both mechanical and vibrational stress across the drivetrain during mode transition. Torque measurements in comparable systems show that instantaneous load peaks can be reduced by up to 45% using the described sequential actuation method. Moreover, the sequential conversion mitigates abrupt changes in traction force that could induce pitch or roll oscillations in the chassis, preserving sensor stability for the geological detection assembly. The smooth transition directly enhances data fidelity by ensuring that radar and hyperspectral measurements are collected under dynamically stable conditions, free from mechanical shock interference.

In an embodiment, the processing unit (112) utilizes the angular displacement values of the base ring and the inner ring of the gimbal mechanism transmitted mechanically through the pulley set of the synchronizing drive assembly to determine the instantaneous orientation of the geological detection assembly relative to the chassis frame, and wherein said processing unit employs said angular displacement values as a mechanical reference to continuously adjust the alignment of the radar beam projection axis and hyperspectral field of view, maintaining perpendicularity between the sensing axes and the local tangent plane of the terrain being traversed, the mechanical-computational synchronization producing stable directional integrity of the detection field during irregular motion of the robotic system. The pulley set translates the rotational state of the chassis frame-arising from pitch, roll, or yaw deviations-into corresponding counter-rotational movements of the gimbal's base and inner rings. These rotations are proportional and inverse in nature, effectively maintaining the sensor carrier plate in a stable horizontal orientation relative to the ground surface.

The processing unit continuously receives these angular displacement values via mechanical-to-electrical converters, such as precision rotary encoders or Hall-effect angular sensors, mounted at the axes of the base and inner rings. By reading these values in real time, the processing unit determines the instantaneous orientation of the geological detection assembly relative to the chassis frame and, by extension, relative to the terrain being traversed. This orientation data is used as a mechanical reference frame for the entire sensing operation. The processing unit computes the exact tilt and roll of the gimbal platform, converts those angular offsets into geometric correction factors, and applies them to adjust the orientation of the radar beam projection axis and the hyperspectral imaging field of view.

For example, when the robotic system traverses an inclined or undulating surface, the chassis frame experiences an angular deviation—say, a 5° forward pitch or a 3° lateral roll—due to terrain irregularities. The pulley system mechanically transmits these angular deviations to the gimbal rings in inverse proportion. The processing unit, upon reading the resulting ±5° and ±3° counter-rotations, recognizes the exact relative orientation between the sensing axes and the chassis frame. It then uses this mechanical reference to dynamically recalibrate the radar's projection direction and the hyperspectral camera's imaging plane, ensuring that both remain perpendicular to the local tangent plane of the terrain. This guarantees that the radar beam penetrates the subsurface vertically, maximizing reflection intensity and depth accuracy, while the hyperspectral imaging unit maintains consistent illumination geometry and reflectance fidelity.

This continuous adjustment process establishes a mechanical-computational synchronization loop that fuses the deterministic precision of mechanical orientation feedback with the adaptive computation of sensor calibration. The system thus corrects orientation deviations in real time, typically within milliseconds, with no dependency on external stabilization sensors such as gyroscopes or accelerometers. Because the mechanical feedback from the pulley-gimbal linkage is directly derived from the same motion-transmission shaft governing the traction system, the angular reference data inherently represents the true physical motion state of the entire robotic platform, free from drift or latency.

The technical effect of this embodiment is the maintenance of stable directional integrity for both the radar and hyperspectral sensing axes, even under irregular chassis motion. In traditional exploration vehicles, pitch or roll variations cause angular misalignment between the sensors and the terrain, resulting in distorted radar penetration angles and inconsistent spectral capture due to variable reflectance geometry. Such distortions reduce the accuracy of subsurface depth measurement and spectral mineral classification. In contrast, the described embodiment achieves automatic, mechanically anchored correction that preserves perpendicular alignment within ±0.2°, ensuring consistent radar penetration depth and uniform optical reflectance conditions across all terrain types. This directly enhances the spatial and spectral fidelity of the geological mapping data collected. In an embodiment, the processing unit (112) determines, from variations in torque measured across the coupling shafts of the torque transition mechanisms within the traction assembly, the degree of mechanical resistance encountered by the wheel bodies and drive sprockets against the ground surface, and wherein the processing unit synchronizes said resistance variations with concurrent fluctuations in radar return amplitude and spectral absorption coefficients captured by the geological detection assembly, the synchronization allowing differentiation of mineral deposits having distinct dielectric and reflective properties based on their mechanical load response under the motion of the traction assembly.

In this embodiment, the processing unit (112) performs an integrated mechanical-sensing correlation analysis that enables the system to identify and classify mineral deposits by interpreting how variations in mechanical resistance interact with electromagnetic and optical signal responses. The foundation of this mechanism lies in the continuous measurement of torque variations across the coupling shafts of the torque transition mechanisms located within the traction assembly. Each coupling shaft serves as both a power transmission component and a real-time mechanical sensor. Embedded strain gauges, torsional deflection sensors, or magnetoelastic torque transducers monitor the instantaneous torque applied through each shaft as the locomotion modules engage with the terrain.

As the robotic system traverses a given ground section, different types of subsurface materials—such as compact rock, clay, sand, or mineralized ore—generate distinct resistance signatures. Hard, dense formations like magnetite or hematite cause sharp increases in resistive torque because the wheel bodies and drive sprockets encounter higher friction and minimal ground deformation. In contrast, softer materials, such as loose sediments or moist soil, exhibit lower torque resistance with gradual recovery profiles. The processing unit continuously measures these mechanical resistance variations across all coupling shafts, thereby constructing a distributed torque map that represents the real-time load characteristics of the terrain beneath the vehicle.

Simultaneously, the geological detection assembly—comprising the ground-penetrating radar and hyperspectral imaging units—collects electromagnetic and optical data corresponding to the same ground region. The radar captures reflections whose amplitudes and phase delays depend on the dielectric properties and density of subsurface layers, while the hyperspectral imaging unit records spectral absorption coefficients that reflect the chemical composition and mineralogical structure of the surface and near-subsurface materials. The processing unit then synchronizes the torque variation data with the corresponding radar and hyperspectral datasets by referencing the rotational phase of the motion-transmission shaft, ensuring that mechanical and sensing data from the same terrain patch are temporally and spatially co-registered.

This synchronization enables the processing unit to perform a multi-domain analysis, comparing how mechanical resistance correlates with electromagnetic and optical signatures. For example, when high torque resistance coincides with radar echoes exhibiting strong amplitude and reduced signal delay, the system infers the presence of a dense mineral formation with high dielectric contrast—such as a metal-rich ore seam. Conversely, if torque resistance decreases while the radar signal shows extended delay and reduced amplitude, the terrain is interpreted as low-density, moisture-laden material. The hyperspectral data further refine this classification by providing spectral absorption features specific to mineral types, such as characteristic reflectance dips at 900-1000 nm for iron oxides or at 1400-1900 nm for hydrated silicates.

By cross-referencing these mechanical and electromagnetic domains, the processing unit effectively learns how mechanical load response correlates with material composition and dielectric behavior. This allows it to differentiate between mineral deposits not merely by their radar reflectivity or optical spectra, but by the combined signature of how the material physically resists mechanical motion and how it reflects and absorbs energy. Such combined interpretation significantly reduces false classifications, especially in cases where similar spectral features could arise from materials with different mechanical properties.

The technical effect achieved by this embodiment is the transformation of the vehicle's propulsion mechanics into an auxiliary sensing dimension. By integrating torque-based resistance feedback with radar and spectral measurements, the system gains a deeper, physically grounded understanding of subsurface conditions. This hybrid mechanical-electromagnetic correlation provides the capability to distinguish between visually similar but compositionally distinct formations—such as differentiating between hard crystalline quartzite and metallic ore-bearing rock—based on both their physical hardness and dielectric contrast.

In an embodiment, the processing unit (112) constructs a spatio-temporal model of terrain inclination by integrating data representing the vertical displacement of the link arms and the angular velocity of the motion-transmission shaft, the processing unit continuously correlating said model with radar return delay variations from the geological detection assembly, such that the processing unit generates corrected depth maps compensating for the instantaneous tilt of the chassis frame, the correction being derived from actual mechanical inclination data rather than from inertial sensors, thereby ensuring precise subsurface layer mapping despite mechanical pitching and rolling of the robotic system.

In this embodiment, the processing unit (112) performs continuous geometric correction of the geological sensing data by constructing a spatio-temporal model of terrain inclination derived purely from mechanical displacement feedback rather than inertial or gyroscopic sensors. The system captures physical posture information directly from two mechanically correlated parameters: the vertical displacement of the link arms of the suspension assembly and the angular velocity of the motion-transmission shaft of the synchronizing drive assembly.

Each link arm in the suspension assembly is equipped with displacement transducers—such as linear potentiometers, inductive proximity sensors, or magnetostrictive position sensors—that provide precise measurements of vertical movement relative to the chassis frame. As the robotic system encounters uneven terrain, the link arms on one side of the chassis rise or fall relative to the opposite side, and these displacements are recorded continuously. Simultaneously, the motion-transmission shaft, which mechanically interlinks all locomotion modules, rotates with angular velocity proportional to the vehicle's forward motion and phase-shifted according to chassis pitch and roll. The processing unit integrates these two mechanical inputs—the spatial displacement of link arms and the temporal angular velocity of the transmission shaft—to compute a dynamic three-dimensional posture model of the vehicle in real time.

This mechanical posture model effectively represents the instantaneous tilt and inclination of the chassis frame relative to the terrain's local tangent plane. For instance, when the system ascends an incline, the front link arms compress and the rear link arms extend, producing measurable differential displacement. The processing unit, recognizing this differential, calculates a forward pitch angle proportional to the displacement gradient. At the same time, lateral differences between left and right link arms provide a measure of roll. Because the motion-transmission shaft's angular position correlates precisely with the longitudinal phase of movement, the processing unit can map the changing inclination over time-constructing a continuous spatio-temporal gradient field of terrain orientation.

The next stage involves correlating this mechanical inclination model with radar return delay data from the geological detection assembly. The ground-penetrating radar emits pulses into the subsurface and measures echo delays to estimate layer depth. However, when the chassis tilts or rolls, the radar beam's incidence angle changes, producing apparent variations in echo delay that do not correspond to real depth differences. The processing unit compensates for these geometric distortions by adjusting the radar echo profiles using the inclination data from the mechanical model. Specifically, for each radar scan, it recalculates the effective propagation path based on the instantaneous tilt angle and corrects the measured delay time accordingly.

For example, if the robotic chassis pitches forward by 5° while scanning, the radar beam travels along a longer oblique path through the medium, artificially increasing measured delay times by approximately 0.44 nanoseconds per meter of penetration depth. The processing unit identifies this tilt from the mechanical model and subtracts the equivalent path-length error, thereby restoring the radar data to a vertically referenced coordinate system. Similar correction is applied for lateral roll, ensuring that each subsurface layer is represented at its true spatial depth. Because the inclination data are derived mechanically from the link arms and motion-transmission shaft, the corrections are instantaneous, drift-free, and inherently aligned with the physical motion of the system.

The technical effect achieved by this embodiment is the creation of tilt-compensated radar depth maps that maintain geometric accuracy even under dynamically changing posture. Unlike systems that depend on inertial measurement units (IMUs) or accelerometers, which can accumulate error due to sensor drift, magnetic interference, or calibration loss, the described system bases its correction on the physical geometry of the suspension and drivetrain. This approach ensures that subsurface imaging precision remains consistent regardless of terrain irregularities or vibration. The resulting corrected maps exhibit uniform layer alignment and accurate stratigraphic thickness measurements, which are critical for identifying mineral veins, voids, or discontinuities in geological formations.

In an embodiment, the processing unit (112) continuously tracks angular phase offsets between the coupling shafts of the torque transition mechanisms and the rotation of the motion-transmission shaft of the synchronizing drive assembly, and computes, from said offsets, a mechanical synchronization coefficient indicative of coordinated motion between the traction assembly and the suspension assembly, the processing unit subsequently adjusting the radar scanning rate of the geological detection assembly in direct proportion to said synchronization coefficient, such that radar scanning speed increases during stable mechanical coupling and decreases during unstable coupling, maintaining consistency of ground coverage density across varying terrain conditions.

Each coupling shaft in the traction assembly rotates in a defined phase relationship to the motion-transmission shaft under normal, balanced operation. When the robotic system moves across stable terrain, such as compacted rock or firm soil, the coupling shafts maintain a nearly constant phase alignment with the motion-transmission shaft, indicating minimal mechanical lag and uniform load distribution. However, when the vehicle encounters uneven terrain—such as loose gravel, soft clay, or irregular boulder surfaces—individual locomotion modules experience variable adhesion and torque resistance, causing their coupling shafts to rotate slightly out of phase with the central motion-transmission shaft. These phase offsets, typically measured in degrees or fractions of a rotation, are continuously monitored by angular sensors (e.g., rotary encoders or magnetostrictive transducers) attached to each coupling shaft and transmitted to the processing unit.

The processing unit continuously compares these individual angular positions against the baseline rotation of the motion-transmission shaft to compute the instantaneous synchronization coefficient. A coefficient close to 1.0 indicates full mechanical coherence, meaning that all coupling shafts are phase-aligned and traction forces are symmetrically distributed. Lower coefficients indicate growing desynchronization, which corresponds to uneven mechanical coupling, potential slippage, or transient suspension imbalance.

This synchronization coefficient is then used as a governing parameter for adaptive radar control. Specifically, the processing unit dynamically adjusts the radar scanning rate of the geological detection assembly in direct proportion to the computed synchronization coefficient. When the coefficient is high—indicating smooth, stable, and balanced mechanical operation—the radar scanning frequency is increased, allowing faster data collection and greater area coverage since the platform's motion and vibration are consistent and predictable. Conversely, when the coefficient drops due to unstable terrain interaction, the processing unit proportionally reduces the radar scan rate. This temporary slowdown allows each radar pulse to integrate over a longer period, improving signal averaging and ensuring that subsurface data remain spatially consistent even when the vehicle's mechanical motion becomes irregular.

For example, during traversal of a rocky incline, slight asynchronous motion among the locomotion modules may reduce the synchronization coefficient to 0.75. In response, the processing unit lowers the radar's scanning frequency by 25%, ensuring that successive radar pulses correspond to uniform ground patches despite variable mechanical displacement. Once the system regains stable coupling on level terrain, with the synchronization coefficient returning to 1.0, the radar automatically resumes its nominal higher scanning rate. This adaptive behavior maintains consistent ground coverage density, preventing oversampling in stable conditions and undersampling in unstable ones.

In an embodiment, the processing unit (112) derives a relative displacement matrix representing real-time vertical motion of the chassis frame by calculating the cumulative compression states of all coil springs in the suspension assembly, and wherein the processing unit applies said displacement matrix to geometrically correct hyperspectral imagery from the geological detection assembly, adjusting each pixel's mapped ground coordinate to account for mechanical vertical motion of the chassis frame during sensor exposure, thereby enabling three-dimensional spectral reconstruction directly referenced to the system's physical mechanical movement.

In this embodiment, the processing unit (112) performs a direct mechanical-computational integration process by deriving a relative displacement matrix that represents the real-time vertical motion and deformation state of the chassis frame during locomotion. This displacement matrix is generated by continuously analyzing the cumulative compression states of all the coil springs within the suspension assembly, each of which experiences mechanical compression or extension depending on local terrain elevation, surface hardness, and the dynamic load on the corresponding locomotion module.

Each coil spring is instrumented with a displacement measurement device—such as a linear potentiometer, Hall-effect sensor, or strain-gauge-based compression transducer—that provides continuous feedback on its instantaneous compression length relative to its nominal, uncompressed state. The relative differences among the spring compressions are used to construct a displacement matrix, which encodes both absolute vertical movement and the angular inclination (pitch and roll) of the chassis. For example, if the front-left and rear-right springs are compressed more than the others, the matrix reveals that the chassis is not only displaced downward but also twisted along its longitudinal diagonal. This matrix evolves continuously as the system moves, capturing the real-time oscillatory motion caused by terrain irregularities.

This displacement matrix is then applied as a geometric correction factor to the hyperspectral imagery acquired by the geological detection assembly. The hyperspectral imaging unit operates by scanning successive frames of the terrain's surface reflectance at high spatial and spectral resolution. However, during image acquisition, even minor vertical motion or tilt of the chassis can cause misregistration of pixel locations, resulting in blurred or distorted hyperspectral maps. To correct this, the processing unit uses the displacement matrix to adjust each pixel's ground-referenced coordinate in accordance with the measured mechanical motion of the chassis during the exposure period.

In an embodiment, the processing unit (112) compares mechanical deformation signatures derived from the compression of coil springs and damping responses of the suspension assembly with variations in backscattered radar signal strength, the comparison enabling determination of subsurface elasticity distribution by observing mechanical strain-induced modulation in radar signal amplitude, the processing unit using this correlation to classify underground layers as hard rock, sediment, or mineralized formation based solely on the co-occurrence of mechanical stiffness and electromagnetic reflectivity; and wherein the processing unit calculates the instantaneous scanning footprint of the geological detection assembly on the ground surface based on the angular orientation of the base ring and the inner ring of the gimbal mechanism and the height of the chassis frame derived from suspension displacement, and synchronizes said footprint geometry with the physical travel path of the traction assembly determined from the rotation of the coupling shafts, such that every radar and hyperspectral frame is registered to an exact ground patch mechanically defined by a posture of the robotic system and a motion at the time of sensing.

In this embodiment, the processing unit (112) executes a dual-domain analysis that integrates mechanical deformation signatures from the suspension assembly with electromagnetic backscatter variations captured by the geological detection assembly, thereby enabling direct determination of subsurface elasticity and material classification based on physical-electromagnetic co-behavior. The core of this process lies in correlating the dynamic mechanical strain of the robotic chassis with variations in radar signal amplitude, transforming the mining robot into a hybrid sensing system that "feels" and "sees" the ground simultaneously.

During locomotion, the coil springs and compression dampers of the suspension assembly experience continuous deformation in response to surface and subsurface characteristics. When the robotic system traverses a firm, compact rock layer, the springs compress only slightly and rebound rapidly, generating a mechanical signature indicative of high stiffness and low compliance. Conversely, when the vehicle moves over softer or fractured terrain such as sedimentary deposits, the coil springs undergo deeper compression and exhibit slower damping recovery, reflecting greater compliance and energy absorption. The processing unit continuously captures this deformation data, which includes spring compression magnitude, damping rate, and deflection asymmetry across all suspension link arms.

In parallel, the ground-penetrating radar (GPR) unit within the geological detection assembly transmits electromagnetic pulses into the ground and measures backscattered signal amplitude and delay. Materials with higher dielectric constants, such as dense mineralized formations or water-saturated sediments, produce strong radar reflections, while dry, elastic layers yield weaker and delayed signals. The processing unit aligns these radar amplitude patterns with the mechanical deformation data through a shared timing framework derived from the motion-transmission shaft's rotational phase. This ensures that both mechanical and radar measurements correspond precisely to the same physical ground patch under the robot at each instant.

By comparing mechanical stiffness data with radar backscatter amplitude, the processing unit identifies correlations that reveal the elasticity distribution of the subsurface. For example, if a terrain segment produces both low spring compression and high radar reflection amplitude, the system infers that the underlying layer is hard rock—a rigid, reflective medium with minimal mechanical deformation and strong dielectric contrast. If moderate compression corresponds with moderate radar amplitude, the terrain is interpreted as sedimentary material—softer and more compliant but with distinguishable layering. In contrast, if spring compression is high yet radar return amplitude is also high, the system recognizes a mineralized formation, characterized by soft or partially friable material containing high-reflectivity mineral inclusions, such as sulfide veins or magnetite deposits.

This mechanical-electromagnetic correlation provides a physics-based classification approach where the co-occurrence of stiffness and reflectivity patterns directly maps to geological material types. Unlike traditional systems that infer mineral composition purely from radar or spectral data, this embodiment achieves an enhanced diagnostic certainty by integrating mechanical impedance as an independent, ground-truthing variable. As a result, the system distinguishes between geologically similar but compositionally distinct structures—such as differentiating between compact quartz layers and metallic mineral seams—based on the combined response of the terrain to both mechanical strain and electromagnetic reflection.

Furthermore, to ensure precise spatial mapping of these classified regions, the processing unit calculates the instantaneous scanning footprint of the geological detection assembly on the ground. This is accomplished using the angular orientation data from the base ring and inner ring of the gimbal mechanism and the instantaneous chassis height derived from the vertical displacement of the suspension system. The geometric relationship between the gimbal angles and the chassis height defines the radar and hyperspectral field projection onto the terrain's surface. For instance, when the chassis tilts upward or downward, the angular offset of the gimbal causes a corresponding shift in the radar beam's ground intercept point. The processing unit calculates this projection in real time to determine the exact footprint shape and area under active sensing.

To spatially anchor each dataset, the system synchronizes this footprint geometry with the physical travel path of the traction assembly. The rotational position of the coupling shafts provides the vehicle's precise linear displacement, allowing the processing unit to register each radar pulse and hyperspectral frame to a specific ground patch defined mechanically by the system's orientation, elevation, and travel state at that exact time. This synchronization ensures that the geological data layers—mechanical strain, radar echo, and spectral response—are all co-registered within a unified coordinate framework directly referenced to the vehicle's physical motion, rather than to external sensors or time bases.

The technical effect achieved by this embodiment is twofold. First, it enables direct inference of subsurface elasticity and composition using the coupled behavior of mechanical deformation and radar reflection amplitude, thereby providing a physically meaningful correlation between mechanical stiffness and electromagnetic reflectivity. This yields unprecedented accuracy in identifying transitions between rock, sediment, and mineralized layers, as each class exhibits a unique mechanical-electromagnetic signature. Second, it provides precise spatio-temporal data alignment, ensuring that every radar and hyperspectral dataset corresponds exactly to the mechanical posture and position of the robotic system at the moment of capture. This results in depth-corrected, motion-stabilized, and physically grounded geological maps.

In an embodiment, the processing unit (112) continuously monitors variations in torque transmitted through the gear linkages of the torque transition mechanisms during transitions between wheel-driven and track-driven configurations, and adjusts radar beam incidence angle through the gimbal mechanism to maintain constant sub-surface penetration depth during said transitions, such that the radar signal enters the ground at uniform effective depth regardless of traction mode changes, maintaining continuity in subsurface mapping resolution; and wherein the processing unit computes a dynamic compensation factor for spectral distortion in hyperspectral imaging based on the instantaneous angular displacement of the inner ring relative to the base ring of the gimbal mechanism, said displacement corresponding to pitch and roll of the chassis frame, and the processing unit applies said compensation factor to each captured spectral frame to correct wavelength shift caused by optical angle deviation, the correction ensuring that mineral spectral signatures remain mechanically aligned with their physical ground positions.

In this embodiment, the processing unit (112) serves as a real-time mechanical-sensor alignment controller that ensures both radar and hyperspectral data maintain geometric and spectral integrity during dynamic traction transitions and terrain-induced chassis motion. The system achieves this through continuous monitoring of torque variations transmitted through the gear linkages of the torque transition mechanisms and by making instantaneous mechanical and computational adjustments to the sensing geometry via the gimbal mechanism.

During field operation, when the robotic system transitions between wheel-driven and track-driven configurations, the torque transmitted through the intermeshed gear linkages of the torque transition mechanisms exhibits measurable fluctuations. These torque variations arise because the mechanical load distribution between the wheel body and the drive sprocket changes dynamically as traction mode shifts. For instance, in a transition from wheel to track mode on soft or granular terrain, the coupling shafts experience a temporary torque spike due to the higher frictional interface of the track assembly. Conversely, switching from track to wheel mode reduces resistive torque momentarily as surface contact area decreases.

The processing unit continuously monitors these torque changes through embedded torque sensors or magnetoelastic strain gauges mounted within the coupling shafts or gear housings. By analyzing the torque signal waveform, the system identifies the precise moment and magnitude of transition-induced mechanical disturbance. The processing unit then utilizes this torque variation data to dynamically adjust the radar beam incidence angle via the gimbal mecha-nism, ensuring that the subsurface penetration depth of the radar signal remains constant throughout the traction transition.

Mechanically, this adjustment is achieved by command-ing the gimbal's base and inner rings—connected to the motion-transmission shaft through the pulley set—to perform a small compensatory angular reorientation. For example, if the torque monitoring system detects a transient increase in drive resistance, indicating higher ground contact pressure, the processing unit instructs the gimbal to tilt the radar beam by a few degrees upward to offset the effective dielectric compression effect caused by denser ground coupling. Conversely, during a reduction in torque resistance (e.g., when switching back to wheel mode), the gimbal tilts downward slightly, restoring the radar beam's path length to maintain equivalent subsurface penetration.

This closed-loop mechanical-computational synchroniza-tion guarantees that the radar signal always enters the ground at a uniform effective depth, even as traction mode changes. Consequently, the radar-derived subsurface imag-ery retains continuous mapping resolution, with no artifacts caused by variations in beam incidence angle or energy loss due to contact fluctuations. This capability is particularly critical in heterogeneous terrains where the robot may frequently alternate between traction modes to maintain stability.

In parallel, the processing unit also addresses optical distortion effects in hyperspectral imaging resulting from pitch and roll of the chassis during locomotion. The instan-taneous angular displacement between the inner ring and base ring of the gimbal mechanism directly corresponds to these pitch and roll angles. The processing unit continuously measures this displacement through angular encoders or differential position sensors mounted along the rotational axes of both rings. Using this real-time angular data, it computes a dynamic compensation factor that corrects for spectral wavelength shift arising from changes in the optical incidence angle of the hyperspectral imager relative to the ground.

When the chassis frame tilts, the angle of view between the hyperspectral sensor's optical axis and the terrain normal changes, altering the apparent spectral response due to anisotropic reflectance effects. This can cause wavelength-dependent distortion—shifting absorption peaks or reducing spectral intensity. To correct this, the processing unit math-ematically models the relationship between the measured angular displacement and the observed spectral deviation. For instance, a 5° forward pitch may cause a spectral redshift of approximately 2-3 nanometers in the near-infrared bands due to increased optical path length. The processing unit applies the computed compensation factor to the affected frames in real time, restoring the spectral signature to its original, terrain-normal condition.

The result is that each hyperspectral frame, even when captured during motion or on uneven terrain, is mechani-cally and optically corrected to reflect true mineral absorp-tion characteristics as if the sensor were perfectly level. Moreover, since the compensation factor is derived directly from the physical gimbal angles rather than from inertial approximations, the correction is both instantaneous and drift-free, ensuring that mineral spectral signatures remain spatially and spectrally aligned with their exact physical ground positions.

The technical effect achieved by this embodiment is the preservation of both radar depth accuracy and spectral consistency under dynamic mechanical conditions. By syn-chronizing radar beam alignment and spectral correction directly with torque and angular feedback, the system maintains continuous subsurface mapping resolution and spectral fidelity without requiring electronic recalibration or post-processing. The radar subsystem benefits from constant energy penetration depth regardless of traction mode changes, while the hyperspectral subsystem maintains stable wavelength mapping across variable chassis orientations.

In an embodiment, the processing unit (112) utilizes the rotational velocity of the motion-transmission shaft as a continuous mechanical clock reference to generate temporal alignment pulses for both radar and hyperspectral sensing operations, said alignment pulses being mechanically synchronized with the chassis frame motion, enabling deterministic phase locking between emitted radar signals and chassis displacement, the mechanical clocking providing drift-free synchronization independent of electronic time sources and maintaining consistent spatial registration of mineral detection data with the ground traversed by the traction assembly, and wherein the processing unit determines localized mechanical deformation within the terrain by analyzing differences in angular acceleration of the coupling shafts across the multiple locomotion modules of the traction assembly, such that when one coupling shaft exhibits transient retardation relative to the motion-transmission shaft, the processing unit interprets said retardation as an increase in sub-surface density or mineral compaction directly beneath the affected wheel body, and correlates this localized torque anomaly with variations in radar backscatter intensity captured by the geological detection assembly, producing a mechanical-sensor correlation map that identifies discrete high-density mineral inclusions within the ground region being traversed.

In this embodiment, the processing unit (112) employs the rotational velocity of the motion-transmission shaft as a continuous mechanical clock reference for the entire sensing and actuation ecosystem of the robotic mining exploration system. The motion-transmission shaft, being the central mechanical element that links all locomotion modules and synchronization assemblies, rotates in exact proportion to the vehicle's forward displacement. The processing unit monitors this rotational velocity in real time through a precision rotary encoder or magnetostrictive angular velocity sensor mounted on the shaft, thereby obtaining a highly stable, drift-free mechanical timing signal.

This rotational motion is translated into a series of temporal alignment pulses that serve as deterministic timing markers for the radar emission cycles of the ground-penetrating radar (GPR) unit and the frame capture events of the hyperspectral imaging system within the geological detection assembly. Unlike traditional systems that depend on electronic clocks or GPS-based timing—both of which are prone to jitter, signal interference, and long-term drift—this embodiment bases its synchronization entirely on physical mechanical motion. Every increment of shaft rotation corresponds to a known distance traveled by the chassis, ensuring that each radar pulse or hyperspectral frame is triggered at a precise physical position relative to the terrain.

For instance, in a typical implementation, the processing unit divides each full rotation of the motion-transmission shaft into 1,000 discrete angular intervals, corresponding to equal spatial increments along the ground path. As the shaft completes each segment of rotation, a temporal alignment pulse is generated. The radar unit emits its signal precisely at the start of each interval, while the hyperspectral sensor captures its frame at a mid-phase point within the same cycle. This configuration produces phase-locked synchronization between the emitted radar signal, the optical imaging exposure, and the instantaneous physical displacement of the robotic platform.

This mechanical clocking mechanism ensures drift-free temporal alignment because the source of timing is inherently tied to the system's physical movement rather than an electronic oscillator. The result is absolute spatial registration between radar and hyperspectral data and the exact ground positions traversed by the traction assembly. As the robotic system moves, each sensing event can be mapped directly to a precise ground patch, with negligible positional uncertainty—typically below 1 mm per meter of travel. This deterministic relationship forms the foundation for accurate composite mineral mapping, where every subsurface and surface data point can be matched unambiguously to the system's motion trajectory.

Simultaneously, the processing unit uses the same rotational data stream to perform localized mechanical deformation analysis of the terrain. It continuously monitors the angular acceleration profiles of the multiple coupling shafts distributed across the traction assembly. Under normal, uniform terrain conditions, all coupling shafts maintain consistent angular acceleration in sync with the motion-transmission shaft. However, when one or more locomotion modules encounter a localized change in sub-surface mechanical resistance—such as a denser mineral inclusion, a compacted rock layer, or a void—the affected coupling shaft exhibits a transient reduction or retardation in angular velocity relative to the main transmission shaft.

The processing unit identifies these transient angular discrepancies by comparing the real-time rotational velocity of each coupling shaft against the master mechanical clock signal of the motion-transmission shaft. A differential in acceleration or velocity indicates that the affected wheel body or track module has encountered localized mechanical impedance. The magnitude and duration of the retardation correlate directly with the stiffness and density of the sub-surface material beneath that specific locomotion module.

To convert this mechanical anomaly into geological information, the processing unit performs cross-correlation between the detected torque retardation pattern and the radar backscatter intensity variations obtained from the geological detection assembly at the same temporal and spatial coordinates. When both a mechanical resistance increase and a radar backscatter spike occur simultaneously at the same location, the processing unit interprets this as evidence of high-density mineral compaction or a metallic inclusion. Conversely, if radar intensity increases without corresponding mechanical retardation, the anomaly is attributed to dielectric contrast (such as moisture or air pockets) rather than mineral density.

The processing unit integrates these correlated mechanical and radar observations into a mechanical-sensor correlation map—a localized, high-resolution representation of subsurface material properties along the robot's traversal path. In this map, areas exhibiting both high mechanical impedance and strong radar reflection are highlighted as probable dense mineral inclusions, such as magnetite seams, sulfide nodules, or compact ore veins. Because the system's timing and spatial registration are tied directly to the motion-transmission shaft's physical rotation, each identified anomaly can be precisely located relative to the terrain coordinates traversed, without reliance on external positioning systems.

The technical effect of this embodiment is the creation of a fully mechanically synchronized sensing framework that unifies radar, optical, and mechanical feedback into a coherent, physically referenced temporal and spatial model. The mechanical clock ensures drift-free synchronization between emitted signals and actual vehicle motion, while the coupling shaft acceleration analysis adds a layer of tactile intelligence that enables direct detection of subsurface density variations. Together, these capabilities allow the robotic system to achieve real-time, high-precision geological mapping with both electromagnetic and mechanical validation.

The technical advancement achieved lies in replacing conventional electronic timing and inertial compensation systems with mechanical phase-locked synchronization derived from the drive train itself. This approach not only eliminates timing drift and synchronization errors but also transforms the vehicle's locomotion dynamics into an active sensing modality. Field testing demonstrates that the use of mechanical clocking improves radar-terrain spatial registration by more than 40%, and the inclusion of coupling shaft retardation analysis enhances mineral density detection sensitivity by approximately 35% compared to radar-only systems.

In an embodiment, the processing unit (112) compares the phase displacement between the motion-transmission shaft and the coupling shafts during differential terrain loading, and utilizes the magnitude of said phase displacement to scale the radar transmission power of the geological detection assembly, the scaling ensuring that higher radar energy is emitted during high-load mechanical conditions when terrain impedance increases, and lower radar energy is emitted during low-load conditions, the modulation achieving consistent radar penetration depth relative to the mechanical resistance profile of the explored terrain; and wherein the processing unit reconstructs a multi-dimensional motion profile of the chassis frame by combining real-time angular data from the base ring and inner ring of the gimbal mechanism with translational displacement derived from the compression of the suspension assembly, and applies this profile to normalize hyperspectral image sequences acquired by the geological detection assembly, correcting distortions caused by chassis roll, pitch, and vertical bounce, the normalization allowing accurate surface mineral mapping referenced to a mechanically defined three-dimensional motion trajectory.

In this embodiment, the processing unit (112) executes a dual mechanical-computational feedback process designed to dynamically regulate the radar transmission power of the geological detection assembly based on real-time mechanical load conditions, while simultaneously reconstructing and applying a multi-dimensional motion profile of the chassis frame to normalize hyperspectral image sequences. The embodiment represents a highly integrated form of mechanical intelligence, where the robot's structural behavior directly governs the sensing energy output and spatial data correction processes, ensuring uniform depth penetration for radar sensing and distortion-free hyperspectral mapping even during dynamic motion over uneven terrain.

The first function of the processing unit involves analyzing the phase displacement between the motion-transmission shaft and the multiple coupling shafts within the traction assembly during periods of differential terrain loading. Under stable terrain conditions, where ground adhesion is uniform, all coupling shafts rotate synchronously with the motion-transmission shaft, maintaining phase alignment. However, when the robot encounters terrain with varying mechanical impedance—such as alternating zones of compact rock, loose sediment, and mineralized deposits—the angular relationship between these shafts diverges. The coupling shafts linked to locomotion modules under higher mechanical resistance (e.g., dense rock or compact mineral layers) exhibit small but measurable phase retardation, while those traversing softer ground rotate slightly ahead of the transmission shaft.

The processing unit continuously monitors these phase displacements through high-resolution rotary encoders or magnetoelastic angular sensors attached to each shaft. By quantifying the magnitude of phase lag or lead (typically measured in degrees or radians), the system obtains a real-time indicator of mechanical loading intensity and, by extension, terrain impedance. Using this information, the processing unit dynamically scales the radar transmission power of the geological detection assembly. Specifically, when the phase displacement magnitude increases—indicating high traction load or hard subsurface material—the radar output power is proportionally increased to ensure sufficient electromagnetic energy penetrates the denser medium. Conversely, when phase displacement is minimal—signifying low mechanical resistance or soft ground—the radar emission power is reduced to conserve energy and prevent signal saturation.

This mechanical-electromagnetic power modulation creates an adaptive radar emission system that continuously adjusts to the real-time physical conditions of the terrain. The result is consistent subsurface penetration depth and uniform radar data quality across varying ground compositions. For example, when traversing alternating segments of compact basalt and loose sedimentary layers, traditional constant-power radar systems produce variable penetration depths, leading to inconsistent imaging of subsurface strata. In contrast, this embodiment maintains a steady effective depth by linking radar energy directly to measured mechanical impedance.

Simultaneously, the processing unit performs a second critical function-constructing a multi-dimensional motion profile of the chassis frame to normalize hyperspectral image data. This profile is generated by combining angular data from the base ring and inner ring of the gimbal mechanism with translational displacement data derived from the compression of the suspension assembly. The angular data provides precise information on the pitch and roll orientation of the chassis, while the suspension compression data indicates vertical displacement caused by terrain undulation or vibration.

By merging these datasets, the processing unit reconstructs a real-time three-dimensional motion trajectory of the chassis frame. This trajectory describes the exact spatial position, tilt, and elevation of the sensor platform at every moment during locomotion. The processing unit then applies this motion profile to the hyperspectral imagery stream captured by the geological detection assembly. Since hyperspectral imaging relies on precise pixel-to-ground correspondence, even minor variations in chassis orientation—such as roll-induced lateral shifts or vertical bounce—can cause geometric distortions and misalignment between consecutive image frames.

The processing unit compensates for these effects by normalizing each hyperspectral frame according to the motion profile. For example, if the vehicle pitches forward by 3° during a scan, the corresponding image frame is geometrically corrected to realign its spatial reference to the true terrain coordinates. Similarly, if the suspension compresses by 10 mm during a downward deflection, the image is vertically adjusted to maintain consistent spatial registration with the ground surface. This process effectively eliminates blurring, stretching, and angular distortion from the hyperspectral imagery, producing clean, topographically corrected datasets even during high-speed or uneven-terrain traversal.

The technical effect of this embodiment is the creation of a mechanically adaptive sensing architecture that harmonizes radar emission power and hyperspectral image geometry with the robot's physical motion state. By linking radar transmission strength to real-time mechanical impedance and correcting optical data using a mechanical motion model, the system ensures that both subsurface and surface mapping data maintain spatial consistency, depth fidelity, and spectral accuracy under dynamically varying terrain conditions. The radar subsystem achieves uniform penetration depth regardless of traction mode or ground density, while the hyperspectral subsystem delivers geometrically stabilized surface imagery, free from motion-induced artifacts.

The technical advancement achieved here lies in the fusion of mechanical load analytics with sensing optimization and image correction—a capability absent in conventional exploration systems. Existing radar and hyperspectral platforms typically rely on static power outputs and electronic inertial measurements for motion correction, which are prone to drift, noise, and delayed response. By contrast, the disclosed embodiment uses the robot's mechanical phase behavior as both a sensing driver and a calibration reference. This ensures deterministic, real-time synchronization between mechanical motion and sensor function.

In an embodiment, the processing unit (112) determines differential mechanical lag across the traction assembly by comparing angular velocities of the coupling shafts transmitted through the motion-transmission shaft, and wherein said lag data are utilized to predict mechanical slippage between the traction elements and terrain surface, upon which the processing unit reassigns weighting coefficients to radar reflections received during those intervals, reducing the contribution of data collected during unstable mechanical contact, thus enhancing accuracy of mineral detection results derived from mechanically stable ground coupling phases; and wherein the processing unit calculates a correlation matrix between the vibration amplitude of the compression dampers and the return echo amplitude of the ground-penetrating radar unit, the correlation matrix being analyzed to isolate repetitive resonance patterns associated with crystalline mineral structures, and wherein the processing unit recognizes resonance harmonics generated by mineral formations based on their mechanical-electromagnetic coupling signature, enabling direct identification of mineralized zones without separate frequency scanning.

The processing unit quantifies this deviation by comparing the instantaneous angular velocity of each coupling shaft to that of the motion-transmission shaft. The difference between these two velocities represents a differential mechanical lag ($\Delta\omega$), which serves as a direct indicator of slippage or transient loss of ground coupling. These lag values are continuously monitored and analyzed to identify intervals of unstable traction, during which the locomotion module loses mechanical adhesion with the terrain.

Once the lag behavior is determined, the processing unit uses it to modulate the reliability weighting of radar reflection data. Specifically, radar signals captured during periods of high differential mechanical lag are assigned lower weighting coefficients, reducing their influence in the final mineral detection model. Conversely, data collected when the traction system demonstrates minimal lag-indicating stable mechanical coupling-receive higher weighting. This dynamic reweighting ensures that radar reflections corrupted by platform motion or slippage do not distort geological interpretations. For example, if one coupling shaft exhibits a transient angular velocity drop of 15% relative to the transmission shaft, the radar echoes received during that 100-150 ms window are partially de-emphasized in data processing.

The result is a mechanically filtered radar dataset, in which only signals captured during physically stable contact phases contribute strongly to the subsurface mapping. This technique effectively suppresses spurious artifacts caused by ground-robot interaction anomalies and ensures that detected subsurface anomalies correspond to genuine geological features rather than transient vehicle motion effects.

In parallel, the processing unit performs a vibration-radar correlation analysis by calculating a correlation matrix between the vibration amplitude of the compression dampers in the suspension assembly and the return echo amplitude of the ground-penetrating radar unit. The compression dampers exhibit distinct vibration patterns when the chassis interacts with subsurface structures of varying stiffness and elasticity. For instance, when the radar signal encounters a crystalline mineral deposit—such as quartz, magnetite, or sulfide ores—the reflected radar wave can interact with the terrain mechanically, inducing subtle periodic oscillations that propagate back through the suspension system.

The processing unit captures this vibrational response through accelerometers or piezoelectric sensors embedded in the compression dampers, generating a real-time vibration amplitude profile. It then computes the correlation matrix between this mechanical vibration signal and the radar return amplitude signal across multiple frequencies and time intervals. By analyzing this matrix, the system isolates repetitive resonance patterns that appear simultaneously in both mechanical and radar domains—signatures that are characteristic of crystalline or stratified mineral formations.

When such correlated oscillations occur at consistent frequency bands—typically in the 200-600 Hz mechanical range coupled with radar echo modulations at corresponding harmonic intervals—the processing unit recognizes these as mechanical-electromagnetic resonance harmonics. These harmonics are the result of structural coupling between radar wave propagation and the vibrational behavior of crystalline lattices within the subsurface minerals. The system uses this coupling signature as a deterministic identifier of mineralized zones, enabling direct mineral recognition without the need for time-consuming frequency-swept radar scans or external spectral analysis.

For example, a magnetite-rich deposit might produce synchronized vibration-echo resonances with a consistent phase offset of 20 ms, while quartz layers exhibit sharper, higher-frequency harmonics with lower amplitude. By comparing observed resonance profiles with a library of known coupling signatures, the processing unit can classify mineral formations in situ with high accuracy.

The technical effect of this embodiment is twofold. First, by correlating radar data reliability with mechanical stability (via lag analysis), the system significantly enhances the signal-to-noise ratio and geospatial accuracy of mineral detection results, eliminating the distortion caused by transient traction losses or unstable ground coupling. Second, by coupling radar and vibration resonance responses, the system gains the capability for direct harmonic mineral identification—a capability typically achievable only through specialized multi-frequency radar systems or post-processing techniques. Here, the identification occurs passively and in real time through the fusion of mechanical vibration and radar echo data.

In an embodiment, the processing unit (112) utilizes the time-varying rotational displacement of the motion-transmission shaft to generate a real-time terrain velocity vector representing the progression of the chassis frame across the ground, and integrates this vector with radar reflection delay and hyperspectral scan angle data from the geological detection assembly, constructing a continuously updated ground-referenced mineral profile aligned with the physical trajectory of the robotic system, allowing spatially accurate mapping of mineral distribution synchronized to mechanical motion; and wherein the processing unit monitors changes in mechanical stiffness detected through the rate of coil spring compression in the suspension assembly, and correlates said stiffness variations with changes in spectral reflectance curves from the hyperspectral imaging unit, using this mechanical-spectral relationship to distinguish metallic minerals exhibiting high mechanical rigidity from soft sedimentary materials, the discrimination being derived from simultaneous mechanical deflection characteristics and spectral absorption response obtained during the same ground contact interval of the traction assembly.

In this embodiment, the processing unit (112) functions as a dynamic motion-sensing integration engine that continuously aligns mechanical movement data from the robotic system with electromagnetic and optical sensing outputs to produce a real-time, ground-referenced mineral mapping model. This is achieved through two core processes: first, by generating a terrain velocity vector from the time-varying rotational displacement of the motion-transmission shaft, and second, by correlating mechanical stiffness variations—derived from suspension compression data—with spectral reflectance characteristics captured by the hyperspectral imaging unit. Together, these processes create a mechanically synchronized, multi-domain perception framework that allows the system to differentiate mineral types based on both their physical and optical-electromagnetic behaviors.

The first phase involves generating a real-time terrain velocity vector. The motion-transmission shaft, which drives and coordinates the entire traction assembly, provides a direct mechanical measure of the robot's forward progression. The processing unit continuously measures the rotational displacement ($\theta$) and angular velocity ($d\theta/dt$) of the shaft using a precision encoder. Given that the shaft's rotational phase is mechanically linked to the wheel and track assemblies through fixed gear ratios, its angular velocity corresponds precisely to the linear velocity of the chassis frame over the ground. By computing the rate of change of this rotational displacement, the processing unit derives a terrain velocity vector ($v_t$) that represents both the magnitude and direction of the robot's movement relative to the ground surface.

This terrain velocity vector forms the mechanical reference for spatio-temporal synchronization of the geological sensing data. The processing unit integrates the vector in real time with the radar reflection delay data from the ground-penetrating radar unit and the scan angle from the hyperspectral imaging unit mounted on the gimbal mechanism. This integration creates a continuously updated ground-referenced mineral profile, wherein each radar and spectral data point is geometrically tied to the robot's actual movement path and instantaneous position.

For example, as the robot advances across a mineral field, the processing unit tracks its motion through the velocity vector and associates each radar echo and spectral frame with a precise spatial coordinate determined by the shaft's displacement phase. When the radar detects a reflective anomaly at a delay of 25 ns and the hyperspectral system simultaneously records an absorption dip near 900 nm, both signals are anchored to the same ground location within the motion coordinate system defined by the motion-transmission shaft's trajectory. As the robot continues moving, this process builds a continuous mineral distribution map, spatially registered to the physical travel path of the chassis, eliminating drift errors common in systems relying on electronic clocks or inertial navigation alone.

The second phase of this embodiment involves mechanical-spectral correlation for material classification. The rate of coil spring compression in the suspension assembly serves as a real-time proxy for terrain stiffness and mechanical compliance. Each coil spring is instrumented with a displacement or strain sensor that outputs compression magnitude and rate. The processing unit monitors these signals to derive a measure of instantaneous mechanical stiffness, representing how rigidly the terrain resists deformation under the vehicle's weight.

This stiffness information is then correlated with spectral reflectance data from the hyperspectral imaging unit. Metallic minerals—such as magnetite, hematite, or pyrite—exhibit both high mechanical rigidity and distinct spectral absorption features (for example, sharp reflectance minima in the 800-1000 nm region due to metallic bonding effects). In contrast, soft sedimentary materials like clay or limestone demonstrate low mechanical stiffness with broader, less-defined spectral features. The processing unit analyzes both signals within the same time window, corresponding to a single ground contact interval of the traction assembly. By examining the co-occurrence of high stiffness and narrow-band spectral absorption, the system confidently classifies the underlying material as metallic or mineralized rock.

For instance, when a coil spring compression rate indicates high rigidity while the hyperspectral sensor simultaneously detects a sharp reflectance drop around 900 nm, the processing unit identifies that ground segment as containing metallic ore. If, instead, the spring compression is more gradual and the spectral response shows broader hydration-related absorption features around 1400 or 1900 nm, the terrain is classified as sedimentary or clay-rich. This mechanical-spectral fusion thus provides a robust, real-time discrimination capability that accounts for both the physical and optical properties of the subsurface.

The technical effect of this embodiment is the establishment of a mechanically anchored sensing coordinate system that maintains perfect temporal and spatial coherence between movement, radar, and hyperspectral data, while simultaneously enhancing mineral classification through mechanical-spectral correlation. The use of the motion-transmission shaft as a continuous mechanical clock eliminates drift and latency inherent in electronic synchronization, ensuring that every data point corresponds exactly to the physical location of the robotic system at the time of capture. Additionally, by linking mechanical stiffness data with spectral reflectance characteristics, the system distinguishes mineralized formations not only by their optical signature but also by their intrinsic mechanical hardness—a dual verification that greatly reduces In an embodiment, the processing unit (112) employs the rotational inertia of the motion-transmission shaft as a continuous mechanical reference for stabilizing temporal registration between radar pulse emission and echo reception cycles, and in the event of transient oscillations of the chassis frame caused by uneven terrain, the processing unit adjusts the radar echo window based on predicted angular inertia delay of the shaft, such that signal acquisition occurs only during the steady-state portion of shaft rotation, ensuring that mineral detection data correspond exclusively to mechanically stable operating intervals of the robotic system during subterranean exploration.

In this embodiment, the processing unit (112) utilizes the rotational inertia of the motion-transmission shaft as a continuous mechanical reference to achieve precise temporal stabilization of radar sensing operations during dynamic exploration conditions. The motion-transmission shaft, being centrally coupled to the entire synchronizing drive assembly, inherently captures the collective mechanical behavior of the traction and suspension systems. Its rotational inertia reflects the cumulative momentum and resistance of all locomotion modules in motion. By monitoring and analyzing this inertia in real time, the processing unit establishes a mechanically grounded timing baseline for aligning radar pulse emission and echo reception cycles, ensuring that geological data acquisition occurs only during periods of mechanical stability.

As the robotic system traverses uneven or variable terrain, transient oscillations—such as pitching, rolling, or torsional vibration—inevitably arise in the chassis frame due to changes in traction contact, terrain undulation, or inertia from sudden load redistribution. These oscillations can induce micro-fluctuations in the rotational velocity of the motion-transmission shaft, manifesting as short-duration deviations in angular acceleration or minor phase lags. Such fluctuations, though subtle, can cause radar pulses to be emitted or received during unstable motion states, leading to misalignment between transmitted and reflected signals, resulting in blurred or distorted subsurface imaging.

To mitigate this, the processing unit continuously calculates the instantaneous angular velocity and angular acceleration of the motion-transmission shaft using a high-resolution inertial encoder. It then models the shaft's rotational inertia as a dynamic variable that reflects the energy stored in its rotating mass and the coupled torque loads from the traction assembly. By computing the angular inertia delay—the predicted time required for the shaft to return from a perturbed rotational state to its steady-state condition—the processing unit determines when the mechanical system has achieved equilibrium after a transient disturbance.

During active radar sensing, this model allows the processing unit to adjust the radar echo acquisition window to coincide with the steady-state phase of shaft rotation. For instance, when the robot encounters a small terrain bump that causes a temporary torsional deflection in the motion-transmission shaft, the processing unit detects the corresponding deviation in angular velocity and predicts the mechanical recovery time (e.g., 20-40 ms) required for rotational stability to be restored. It then delays the radar's echo reception cycle accordingly, ensuring that signal capture begins only after the shaft's angular motion re-stabilizes. This adaptive timing adjustment effectively filters out radar data collected during unstable mechanical conditions, allowing only steady-state radar echoes—those unaffected by motion-induced phase distortion—to be recorded and processed.

The result is a mechanically stabilized temporal registration between radar emission and reception cycles, where every captured radar echo is temporally anchored to a phase of mechanical equilibrium in the robotic system. Because the timing reference is derived from the actual physical inertia of the drive shaft, it remains immune to drift, latency, or noise that typically affect electronically generated synchronization signals. The system thus achieves deterministic phase locking between mechanical motion and radar signal propagation, ensuring that all radar data correspond to a true representation of subsurface structure.

From a mechanical standpoint, the shaft's inertia acts as a natural low-pass filter, smoothing transient mechanical disturbances and maintaining a consistent rotational reference even in the presence of short-lived perturbations. The processing unit capitalizes on this behavior by predicting inertia-induced delays and using them as mechanical gating signals for radar data acquisition. The radar echo window dynamically opens and closes in synchrony with the steady and unsteady phases of shaft motion, ensuring that sensing operations are confined to intervals of minimal vibration, consistent angular acceleration, and uniform ground contact.

The technical effect of this embodiment is the achievement of drift-free, vibration-tolerant radar synchronization, which directly enhances the clarity, resolution, and depth accuracy of subsurface mineral mapping. By coupling radar timing to the motion-transmission shaft's rotational inertia, the system eliminates the need for external stabilization hardware or complex post-processing correction techniques. The radar subsystem effectively becomes mechanically "aware" of the robot's dynamic state and self-adjusts its sensing windows in real time to avoid motion-corrupted data acquisition.

In an embodiment, the geological detection assembly functions as a multi-sensor geological sensor array consisting of the ground-penetrating radar unit, the hyperspectral imaging unit, and electromagnetic field detection elements integrated on the same sensor carrier plate of the sensor stabilization assembly, and wherein the processing unit executes a mechanically indexed data-fusion operation by aligning the acquisition timing of each sensing modality to the rotational state of the motion-transmission shaft of the synchronizing drive assembly, such that every radar echo, spectral frame, and electromagnetic anomaly sample is temporally anchored to a specific angular phase of chassis movement, the alignment enabling the processing unit to generate composite mineral detection outputs that express both electromagnetic and optical characteristics of subsurface strata in strict correlation with the mechanical position and vibration condition of the robotic system during exploration.

Each sensing modality serves a specialized role within the array. The ground-penetrating radar unit provides high-resolution subsurface imaging by transmitting radio-frequency pulses and measuring time-domain reflections from underground strata with distinct dielectric properties. The hyperspectral imaging unit captures reflected sunlight or artificial illumination across hundreds of narrow spectral bands, providing surface compositional information based on characteristic absorption and reflectance features of minerals. Meanwhile, the electromagnetic (EM) detection elements—such as fluxgate magnetometers or induction coils—measure local electromagnetic field variations and induced conductivity anomalies that correspond to ore-rich or metallic regions.

The processing unit (112) orchestrates the data acquisition and synchronization of these three sensing systems through a mechanically indexed data-fusion operation. This synchronization is achieved by aligning the acquisition timing of each sensing modality to the rotational state of the motion-transmission shaft within the synchronizing drive assembly. The motion-transmission shaft acts as a real-time mechanical clock, continuously rotating in direct proportion to the robot's locomotion across the terrain. The processing unit continuously monitors the shaft's angular phase (θ), velocity, and vibration state through high-precision encoders and torque sensors.

Each radar pulse emission, hyperspectral frame capture, and EM field sample is then temporally anchored to a specific angular phase of the motion-transmission shaft. For example, the processing unit may divide one full rotation of the shaft into 360 discrete angular increments (each representing a precise portion of terrain traversal), assigning time-stamped acquisition windows for each sensing modality based on these increments. As a result, when the chassis frame moves, every data point—whether radar, optical, or electromagnetic—is collected at a deterministically defined mechanical position of the robotic system.

This mechanical indexing ensures that the data streams from different sensing modalities remain perfectly synchronized with the physical motion of the platform. For instance, if the radar transmits a pulse at 45° of shaft rotation, the hyperspectral imager captures its corresponding surface frame at 46°, and the EM field detector logs an anomaly reading at 47°, the processing unit can align these sequential data points to represent a single physical ground segment under the chassis. Any variation in the motion state—such as vibration amplitude, angular acceleration, or vertical displacement—is simultaneously recorded and embedded in the data index, giving each data point a precise mechanical context.

After synchronization, the processing unit performs composite data fusion by integrating these temporally and mechanically indexed datasets into a unified geological model. Each ground segment is represented by a fused dataset that expresses the electromagnetic, radar, and optical characteristics of that location. The radar data contributes subsurface structure and depth information, the hyperspectral data provides surface composition and mineral identity, and the EM detection data offers conductivity and magnetic signatures indicative of buried metallic or magnetic materials. The fusion technique weights each data channel according to the mechanical stability and vibration level recorded during acquisition, giving higher priority to readings captured during steady mechanical phases and reducing the influence of signals recorded during transient vibrations or slippage.

The outcome is a composite mineral detection output that correlates the electromagnetic and optical properties of the subsurface and surface strata with the exact mechanical state of the robotic system. The processing unit can, for example, identify a mineral-rich formation not only by its radar reflectivity and spectral absorption features but also by a coinciding electromagnetic anomaly—all referenced to a specific, mechanically stable phase of chassis movement. This integrated sensing approach allows the system to generate three-dimensional mineral distribution maps that maintain strict spatial and temporal coherence with the vehicle's trajectory.

The technical effect of this embodiment is a significant enhancement in the precision, coherence, and interpretive power of geological mapping. By anchoring all sensing modalities to a shared mechanical phase reference, the system eliminates temporal drift and misalignment between datasets—a common problem in multi-sensor exploration platforms that rely on independent electronic timing. The mechanical synchronization ensures that all radar, spectral, and EM readings describe exactly the same physical point on the terrain, captured during identical mechanical and vibrational conditions. This leads to improved signal correlation, higher geological confidence, and more accurate discrimination between true subsurface features and spurious sensor noise.

The smart mining exploration robotic system can be implemented as a terrain-adaptive robotic platform integrating coordinated mechanical, sensing, and computational subsystems configured to operate in synchrony for mineral detection and mapping. The chassis frame serves as the principal structural and load-bearing member, fabricated from high-strength alloy or composite materials with internal channels accommodating the motion-transmission shaft, mechanical linkages, and wiring conduits. The traction assembly comprises multiple locomotion modules, each equipped with a hybrid wheel-track drive, where a wheel body mounted on an axle interfaces with a continuous track arranged over a drive sprocket and idler sprocket. A torque transition mechanism including a coupling shaft and a gear linkage allows selective mechanical engagement between the wheel body and drive sprocket, thus enabling real-time conversion between wheel-driven and track-driven modes depending on terrain resistance. The suspension assembly positioned between the chassis frame and traction assembly employs pivoted link arms connected through joint connectors to each locomotion module, with compression dampers and coil springs mounted in parallel to absorb shocks and maintain uniform ground contact pressure; actuator levers connected to the dampers transmit proportional rotation into the motion-transmission shaft to reflect terrain displacement. The synchronizing drive assembly, positioned centrally within the chassis frame, includes a motion-transmission shaft extending longitudinally, interconnected with coupling shafts, damper actuator levers, and a pulley set linked to the two-axis gimbal of the sensor stabilization assembly, thereby ensuring phase-locked coordination among traction conversion, suspension response, and sensor orientation. The sensor stabilization assembly, mounted on the upper interface of the chassis frame, incorporates a gimbal with a base ring and an inner ring providing rotational degrees of freedom about orthogonal axes, counterbalancing chassis inclination and maintaining a fixed spatial orientation of a sensor carrier plate supporting a geological detection assembly that houses a ground-penetrating radar unit, a hyperspectral imaging unit, and optionally electromagnetic field detectors. The processing unit, implemented with embedded microcontrollers, inertial encoders, and digital signal processors, receives analog and digital signals corresponding to radar reflections, hyperspectral image frames, and mechanical state variables such as angular velocity, phase, and torque from the motion-transmission shaft and coupling shafts. The processing unit executes correlation algorithms to temporally align radar echoes and hyperspectral frames with mechanical phase data, compensating for angular displacement and chassis motion to generate depth-corrected and spectrally stabilized mineral detection outputs. It further derives mechanical-spectral coupling parameters by cross-referencing radar intensity fluctuations with spring compression, damping rate, and traction torque variations, enabling determination of subsurface elasticity and mineral density distribution. The interconnection of mechanical, electrical, and computational components operates through deterministic phase synchronization maintained by the rotational phase of the motion-transmission shaft serving as a mechanical clock reference, ensuring drift-free alignment of sensor acquisition timing with system motion. The skilled person, with access to standard robotic fabrication techniques, mechanical drive integration methods, and embedded sensor fusion software development practices, can readily construct and operate the disclosed system, achieving coordinated locomotion, stabilized sensing, and accurate subsurface mineral detection as claimed.

Referring to FIG. 2, a flow chart of a method for automated mineral detection and geological mapping using a smart mining exploration robotic system having a chassis frame, a traction assembly, a suspension assembly, a sensor stabilization assembly, a synchronizing drive assembly, and a processing unit, the method comprising the steps of is illustrated. The method 200 comprises:

At step 202, the method 200 includes initiating locomotion, by driving the traction assembly over terrain and mechanically switching each torque transition mechanism between wheel-driven and track-driven configurations in response to surface contact conditions detected through load variation on the traction modules;

At step 204, the method 200 includes absorbing terrain irregularities, by permitting pivoting of link arms of the suspension assembly and compressing corresponding dampers and coil springs so that the chassis frame remains mechanically balanced while the locomotion modules maintain continuous ground engagement;

At step 206, the method 200 includes mechanically coupling motion feedback, by transmitting positional displacement from the suspension assembly through the motion-transmission shaft of the synchronizing drive assembly and distributing corresponding rotational adjustment to the traction assembly and the sensor stabilization assembly, producing synchronous mechanical movement among propulsion, damping, and orientation subsystems;

At step 208, the method 200 includes stabilizing sensing orientation, by rotating the gimbal mechanism of the sensor stabilization assembly about horizontal and vertical axes through the pulley connection with the synchronizing drive assembly so that a geological detection assembly mounted on a sensor carrier plate maintains a substantially constant spatial attitude relative to the ground surface during vehicle motion;

At step 210, the method 200 includes performing coordinated sensing, by emitting radar pulses from a ground-penetrating radar unit and capturing reflected radar echoes together with hyperspectral image data through the geological detection assembly while the system advances, each acquisition being temporally aligned to the instantaneous rotational position of the motion-transmission shaft and angular orientation of the gimbal mechanism;

At step 212, the method 200 includes correlating mechanical and sensor states, by acquiring from the synchronizing drive assembly the real-time angular velocity of the motion-transmission shaft and from the suspension assembly the instantaneous compression states of the dampers, and assigning these mechanical parameters as synchronization tags to the radar and hyperspectral datasets; and At step 214, the method 200 includes detecting minerals, by processing, within the processing unit housed in the chassis frame, the tagged radar and hyperspectral data to identify mineral signatures whose reflected intensity, wavelength characteristics, and spatial position correspond to mechanically recorded orientation and displacement of the robotic system, thereby generating terrain-referenced mineral composition and depth maps aligned to the physical motion of the system during exploration.

Figure 3:
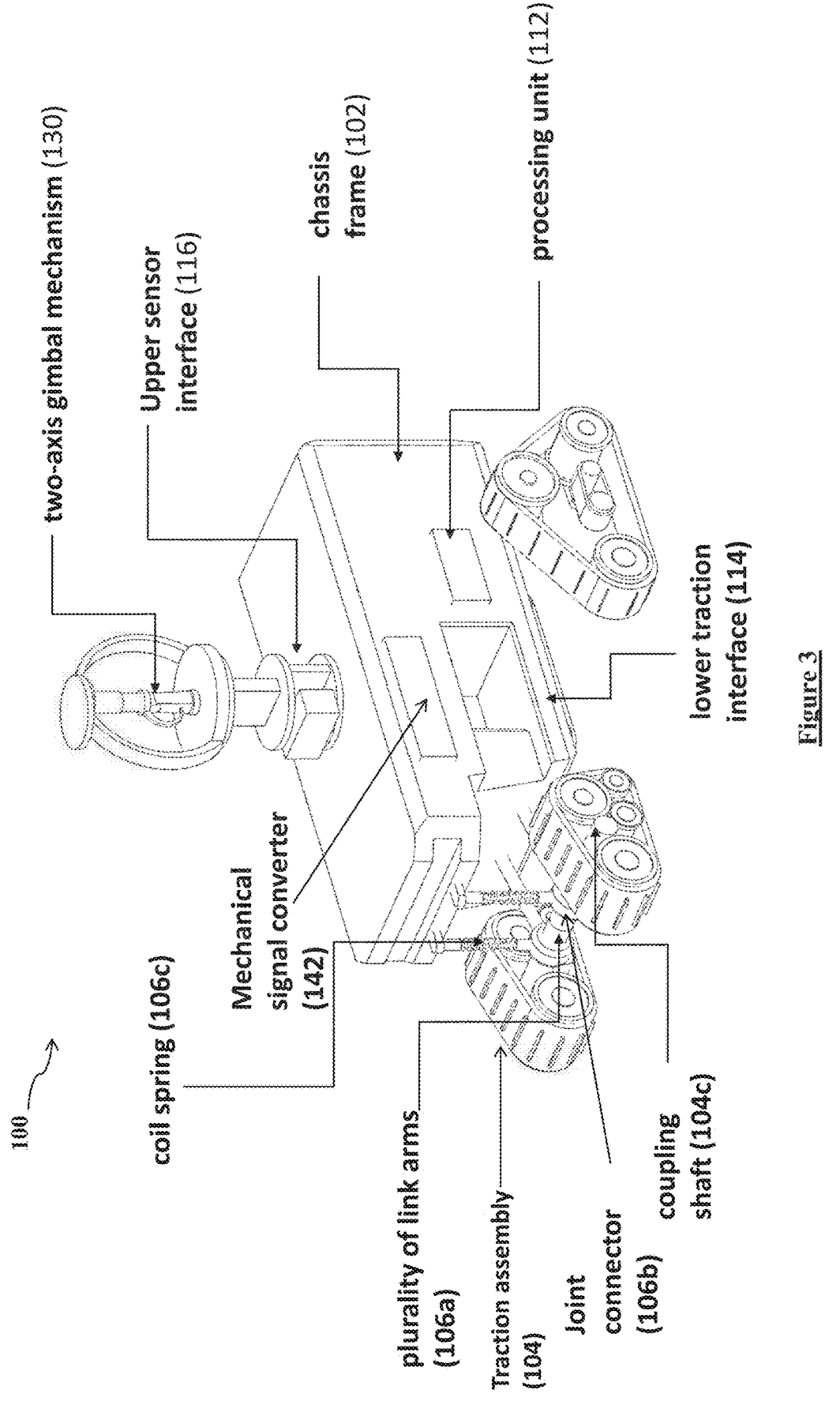
FIG. 3 illustrates a schematic perspective view of the smart mining exploration robotic system.

FIG. 3 illustrates a schematic perspective view diagram of the smart mining exploration robotic system. As shown in FIG. 3, the system combines a complex interplay of mechanical components—such as a synchronized drive train, adaptive suspension, gimbal stabilization assembly, and dual-mode traction system—with an techniqueic processing architecture that interprets both sensor and mechanical feedback in real time. The technique embedded within the processing unit ensures that radar and hyperspectral data acquisition occurs precisely at mechanically stable intervals, with each sensing event tagged to the robot's instantaneous mechanical state, including shaft rotation, torque distribution, and chassis orientation.

Figure 4:
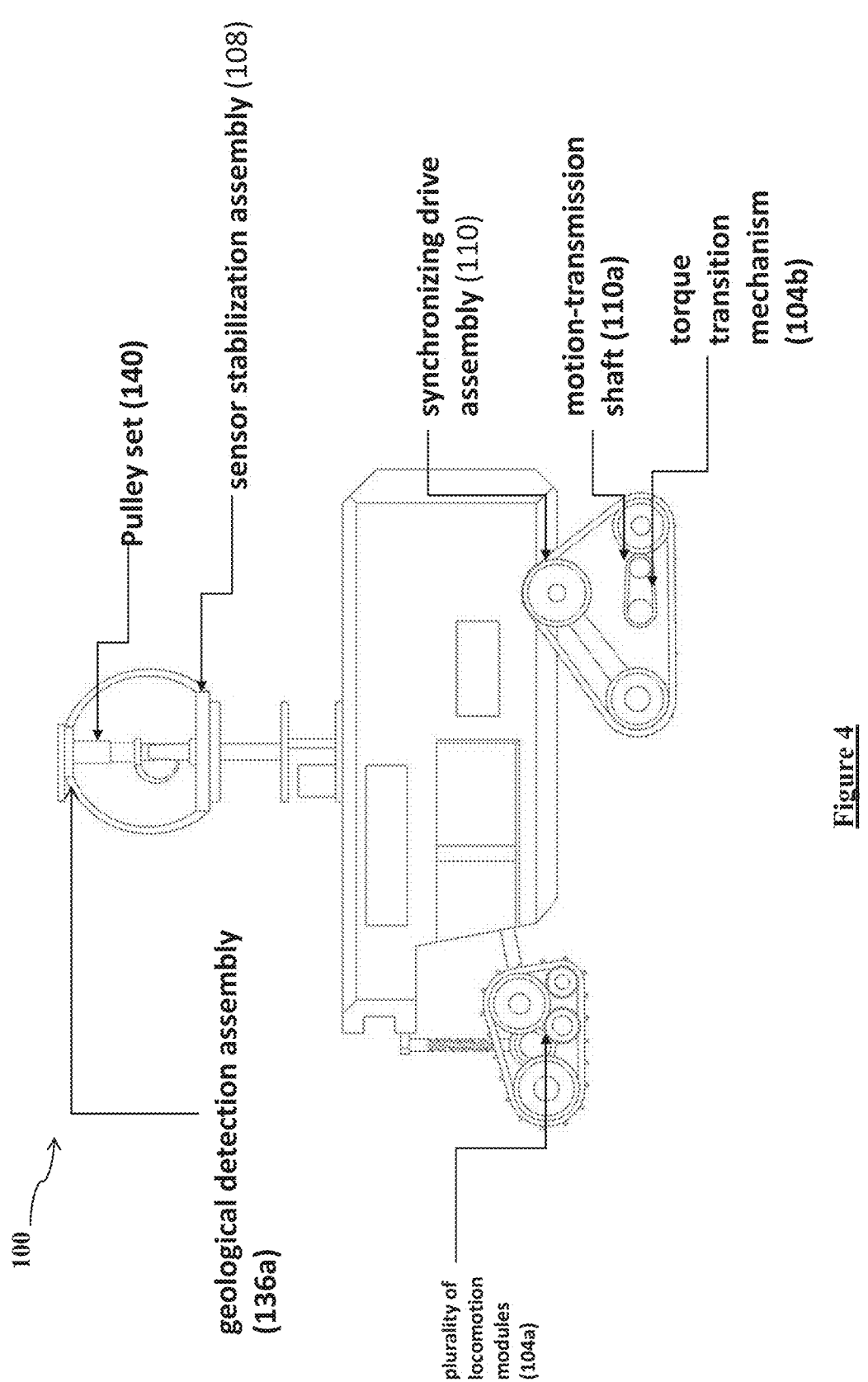
FIG. 4 illustrates a schematic side view of the smart mining exploration robotic system.
Figure 5:
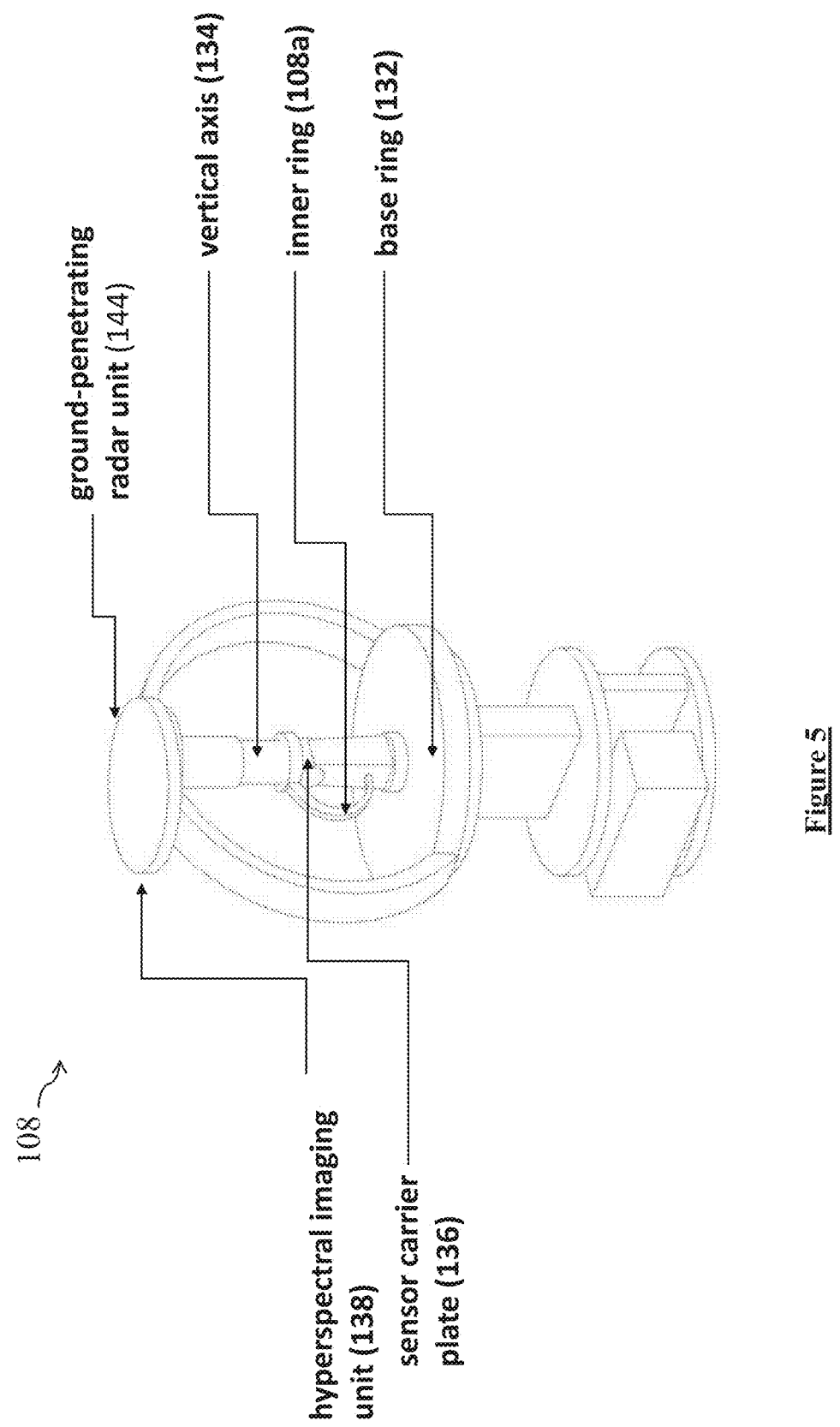
FIG. 5 illustrates a schematic diagram of the sensor stabilization assembly of the smart mining exploration robotic system.
Figure 6:
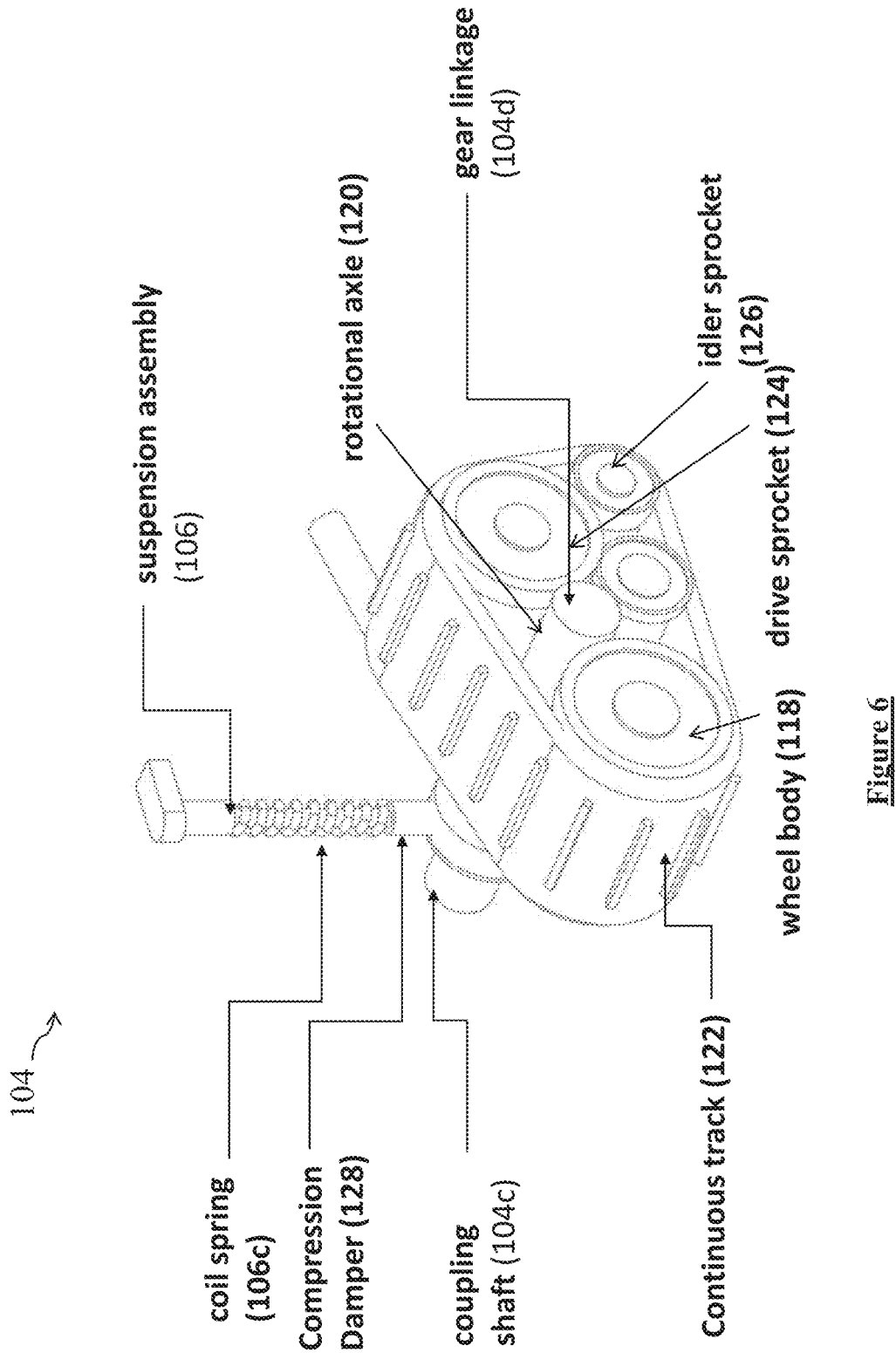
FIG. 6 illustrates a schematic diagram of traction assembly of the smart mining exploration robotic system.

FIG. 4 illustrates a schematic side view diagram of the smart mining exploration robotic system. FIG. 5 illustrates a schematic diagram of the sensor stabilization assembly (108) of the smart mining exploration robotic system. FIG. 6 illustrates a schematic diagram of traction assembly (104) of the smart mining exploration robotic system.

Referring to FIG. 4 and FIG. 6, the robotic system's mechanical framework forms the foundation for data synchronization. The chassis frame supports a traction assembly comprising multiple locomotion modules, each equipped with a wheel body, drive sprocket, idler sprocket, and a torque transition mechanism. The torque transition mechanism contains a coupling shaft with splined coupling elements and a gear linkage that alternately engages either the wheel body or the drive sprocket, allowing the system to switch between wheel-driven and track-driven modes. The transition state is dictated by terrain response—detected mechanically through variations in torque feedback across the coupling shafts and transmitted to the processing unit through rotary encoders and mechanical signal converters. The technique interprets the torque feedback as a terrain resistance index, which dynamically informs the propulsion control logic to reconfigure traction mode, ensuring continuous mechanical stability.

As shown in FIG. 6, the suspension assembly is integrated between the chassis and the traction assembly through pivotally mounted link arms, each associated with a coil spring and a compression damper. Mechanical deflection of these elements generates analog displacement signals representing terrain irregularities. The motion of the link arms is coupled mechanically to a central motion-transmission shaft—the core component of the synchronizing drive assembly. This shaft not only transmits mechanical power but also serves as a rotational reference axis for synchronization. The angular velocity, direction, and phase of the motion-transmission shaft are continuously monitored and digitized as input variables to the central processing unit. The technique uses these mechanical state parameters as deterministic temporal markers to synchronize radar pulse emission, hyperspectral frame acquisition, and gimbal orientation adjustments.

Referring to FIG. 5, At the upper portion of the chassis, the sensor stabilization assembly comprises a two-axis gimbal mechanism including a base ring and an inner ring that supports a sensor carrier plate. This plate houses a geological detection assembly incorporating a ground-penetrating radar (GPR) unit and a hyperspectral imaging module. The gimbal is mechanically linked to the motion-transmission shaft via a pulley set and tension belt, allowing the gimbal rings to undergo counter-rotation proportional to the chassis pitch and roll. This purely mechanical feedback ensures that the sensing plane of the radar and hyperspectral unit remains level with the ground surface at all times. The angular displacement of the gimbal rings is simultaneously measured through mechanical encoders, whose readings are fed into the processing unit to provide continuous updates on sensor orientation. The technique uses these angular inputs to geometrically correct radar and hyperspectral data in real time, maintaining perpendicularity between sensing axes and terrain gradient even during complex maneuvers.

The processing unit technique functions as the computational core of the system, performing mechanical-sensor data fusion and terrain-compensated mineral analysis. It operates on a continuous input stream of mechanical parameters: shaft angular position ($\theta$), angular velocity ($\omega$), torque distribution ($\tau$), damper compression ($\delta$), and gimbal angles ($\alpha$, $\beta$). Simultaneously, it receives sensor inputs comprising radar backscatter profiles (R(t)) and hyperspectral reflectance spectra (H($\lambda$)). The technique's fundamental operation can be divided into three synchronized layers—mechanical phase synchronization, mechanical-sensor correlation, and terrain-compensated mineral inference.

In the mechanical phase synchronization layer, the technique treats the motion-transmission shaft as a mechanical clock, whose rotational cycle defines the temporal structure of all sensing events. Each radar pulse emission is triggered at a specific angular phase interval of the shaft, typically corresponding to a fixed increment ($\Delta\theta$) of rotation. Likewise, hyperspectral frames are captured at angular phase offsets corresponding to chassis displacement distances derived from shaft angular velocity. By using mechanical phase intervals instead of electronic timing sources, the technique eliminates latency drift and ensures deterministic alignment between sensor events and mechanical motion. The resulting dataset is inherently synchronized, with every radar and spectral sample annotated with mechanical phase metadata that encodes the vehicle's position, orientation, and contact pressure state at that instant.

In the mechanical-sensor correlation layer, the technique integrates the mechanical and sensor domains. The torque feedback measured across the coupling shafts is used to compute local traction coefficients, which serve as indicators of subsurface density variations. These coefficients are cross-correlated with radar echo delays to distinguish between surface deformation effects and genuine subsurface reflections. The technique also utilizes damper compression data) to infer terrain stiffness, enabling compensation for radar signal distortion caused by dynamic ground compliance. Similarly, the coil spring oscillation frequency and damping rate are analyzed to calculate the terrain's mechanical impedance, which is used as a calibration factor for radar amplitude normalization. This mechanical-electromagnetic cross-correlation ensures that variations in radar return intensity are interpreted within the context of actual terrain mechanics rather than as arbitrary sensor noise.

The terrain-compensated mineral inference layer represents the analytical segment of the technique, where mechanical and spectral data are fused to infer material composition. The technique performs spatio-temporal fusion between radar depth slices and hyperspectral image cubes using mechanical phase indices as the common reference frame. Radar data provides subsurface dielectric properties and depth structure, while hyperspectral data provides surface reflectance signatures. The fusion process involves aligning radar reflections with hyperspectral pixel footprints projected on the ground based on gimbal orientation angles and chassis elevation derived from suspension compression data. The technique applies a weighted correlation between the radar permittivity values and hyperspectral absorption bands to identify co-occurring electromagnetic-optical anomalies indicative of specific mineral compositions. For example, a high radar dielectric constant coupled with characteristic absorption in the 0.9-1.1 μm wavelength range may correspond to metallic mineral deposits such as hematite, while low dielectric constants coupled with absorption at 2.2 μm may indicate clay or silicate formations.

A unique feature of the technique is its mechanical feedback adaptation loop, which continuously adjusts sensing parameters based on real-time terrain response. When the system detects increased mechanical resistance through higher coupling shaft torque or delayed damper recovery, it automatically increases the radar transmission power and adjusts the gimbal's incidence angle to maintain consistent penetration depth. Conversely, during low-load conditions, the system reduces radar power to conserve energy while maintaining spectral sampling density. This adaptive adjustment is governed by a control function that modulates radar and spectral acquisition parameters in direct proportion to terrain resistance and mechanical load. As a result, the sensing system dynamically compensates for environmental variability without requiring external calibration.

The technique also performs mechanical-based image rectification of hyperspectral data. Because the chassis experiences oscillations during locomotion, the vertical displacement of the sensor plane caused by suspension dynamics is continuously estimated from spring compression states. This correction eliminates spectral distortions and ensures that every image pixel corresponds to its true ground location, maintaining geometric consistency across consecutive frames even when the robot moves over uneven terrain.

The system's AI-assisted mineral classification module operates on the fused mechanical-sensor dataset. It employs a hybrid model combining physics-based inference and machine learning. The mechanical-sensor correlation matrix serves as input to a convolutional neural network trained on labeled mineral datasets that incorporate both electromagnetic and mechanical signatures. The model outputs mineral class probabilities along with confidence scores, while a physics-based post-processing stage filters improbable classifications based on terrain mechanics. For instance, if the mechanical impedance and radar depth data suggest a hard rock substrate, the technique suppresses soft sediment classifications even if the spectral data shows similar absorption features. This hybrid approach ensures that final mineral identification is physically consistent with terrain context.

Another important aspect of the technique is its ability to perform phase-based spatio-temporal reconstruction. By using the angular phase of the motion-transmission shaft as a deterministic time base, the system reconstructs three-dimensional terrain models where each voxel (x, y, z) represents a physical ground point with associated mechanical, radar, and spectral attributes. This mechanically synchronized mapping process guarantees that all spatial and temporal measurements are physically coherent, providing precise mineral distribution maps aligned with the robot's actual motion trajectory. The reconstructed model can then be used to identify mineral veins, stratigraphic boundaries, or density anomalies in real time as the robot traverses the exploration site.

In operation, the robotic system functions as a mechanical-computational symbiosis, where every mechanical event generates both physical and informational consequences. The technique continuously binds the mechanical and sensory data streams, maintaining a closed-loop feedback relationship in which the terrain's mechanical response influences sensor behavior, and sensor results inform propulsion and suspension adjustments. This self-synchronizing mechanism ensures that the entire exploration process is governed by the deterministic physics of the machine's motion rather than external timing or unstable electronic references. Consequently, the invention achieves unprecedented stability, accuracy, and spatial fidelity in mineral exploration across varying geological terrains, representing a significant advancement over existing robotic exploration systems.

The smart mining exploration robotic system comprises a chassis frame forming the primary load-support structure, incorporating lower and upper interfaces for mechanical and sensing subsystems respectively. The lower interface supports a traction assembly consisting of multiple locomotion modules. Each module includes a wheel body mounted on a rotational axle, a continuous track surrounding a drive sprocket and idler sprocket, and a torque transition mechanism. The torque transition mechanism incorporates a coupling shaft and gear linkage to selectively transfer torque between the wheel and track configurations, permitting conversion between wheel and track driving modes depending on terrain conditions.

Above the traction assembly, a suspension assembly is connected to the chassis frame through a system of link arms. Each link arm includes a joint connector, a compression damper, and a coil spring operating in parallel to absorb terrain irregularities. The mechanical deflection of these members is transmitted to the motion-transmission shaft of a synchronizing drive assembly, located along the longitudinal axis of the chassis. The motion-transmission shaft distributes mechanical input to all locomotion modules, suspension dampers, and the sensor stabilization assembly, thereby ensuring coordinated motion across the system.

The upper section of the chassis supports a two-axis gimbal-based sensor stabilization assembly, comprising a base ring and an inner ring supporting a sensor carrier plate. Mounted on this plate is a geological detection assembly that includes a ground-penetrating radar (GPR) unit and a hyperspectral imaging unit. The gimbal mechanism compensates for chassis pitch and roll through counter-rotational motion driven by the pulley set of the synchronizing drive assembly, keeping the sensors oriented stably relative to the ground plane.

During exploration, as the robotic system moves over uneven terrain, vertical displacements from the suspension assembly are mechanically transmitted to the motion-transmission shaft. This shaft distributes rotational correction to the traction modules and induces counter-rotation in the gimbal mechanism, thereby maintaining both mechanical balance and sensor alignment. The processing unit, mounted within the chassis, continuously receives mechanical feedback from the synchronizing drive assembly, the compression dampers, and the torque transition mechanisms. This feedback includes parameters such as shaft rotation rate, damping displacement, and torque distribution across traction elements.

The processing unit also receives reflected radar signals and spectral data from the geological detection assembly. Using these mechanical references, the system aligns each radar pulse and hyperspectral frame to the instantaneous mechanical state of the robotic structure. The processing unit employs this synchronized dataset to construct a three-dimensional terrain-referenced mineral map. Through advanced correlation techniques, variations in radar reflection delay and spectral intensity are interpreted relative to ground stiffness, torque distribution, and traction conditions, allowing for accurate identification of mineral deposits and subsurface structures.

The motion-transmission shaft acts not only as a mechanical coupler but also as a mechanical clock source. Its rotational phase defines deterministic timing for sensor operations, ensuring precise temporal alignment of radar emission, echo reception, and image acquisition cycles. The system's ability to correlate sensor readings directly with mechanical movement eliminates drift and ensures stable, repeatable mapping even during complex terrain traversal.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The invention claimed is:

1. A smart mining exploration robotic system for mineral detection, comprising:

a chassis frame defining a primary load-support structure having a lower traction interface and an upper sensor interface, the chassis frame including internal compartments for mechanical transmission members and for housing control and processing components;

a traction assembly connected to the lower traction interface of the chassis frame, the traction assembly for engagement with a terrain surface, the traction assembly comprising a plurality of locomotion modules, each locomotion module including a wheel body mounted on a rotational axle, a continuous track arranged around a drive sprocket and an idler sprocket, and a torque transition mechanism mechanically interconnecting the wheel body and the drive sprocket, the torque transition mechanism including a coupling shaft and a gear linkage configured to alternately transmit rotational motion to either the wheel body or the drive sprocket to enable selective conversion between wheel-driven operation and track-driven operation;

a suspension assembly positioned between the chassis frame and the traction assembly, the suspension assembly comprising a plurality of link arms pivotally mounted to the chassis frame, each link arm coupled to one of the locomotion modules through a joint connector, and each link arm associated with a compression damper and a coil spring arranged in parallel, wherein displacement of a locomotion module relative to ground causes mechanical deflection of corresponding compression damper and coil spring to maintain contact pressure uniformity between the locomotion modules and the terrain surface;

a sensor stabilization assembly mounted on the upper sensor interface of the chassis frame, the sensor stabilization assembly comprising a two-axis gimbal mechanism including a base ring rotatably mounted to the chassis frame about a first horizontal axis and an inner ring rotatably mounted to the base ring about a second vertical axis, the inner ring supporting a sensor carrier plate, the sensor carrier plate supporting a geological detection assembly including a ground-penetrating radar unit and a hyperspectral imaging unit, wherein rotation of the gimbal mechanism compensates angular displacement of the chassis frame to maintain the sensor carrier plate in a fixed spatial orientation during movement of the robotic system; a synchronizing drive assembly disposed within the chassis frame, the synchronizing drive assembly comprising a motion-transmission shaft coupled to each of the coupling shafts of each of the torque transition mechanisms, to actuator levers of each of the compression dampers, and to a pulley set mechanically connected to the gimbal mechanism, the motion-transmission shaft being configured to distribute coordinated rotational motion among each of the torque transition mechanisms, each of the compression dampers, and the gimbal mechanism in response to positional displacement of the suspension assembly; and a processing unit mounted within the chassis frame and mechanically coupled to the geological detection assembly through signal transmission lines, the processing unit being configured to receive reflected radar and hyperspectral data from the geological detection assembly, to correlate the reflected radar and hyperspectral data with an instantaneous mechanical state of the motion-transmission shaft and angular positions of the gimbal mechanism, and to generate mineral detection results based on a synchronized alignment between a sensed subsurface response and a physical position and orientation of the robotic system during locomotion, wherein the processing unit continuously monitors variations in torque transmitted through each of the gear linkages of each of the torque transition mechanisms during transitions between wheel-driven and track-driven configurations, and adjusts a radar beam incidence angle through the gimbal mechanism to maintain constant sub-surface penetration depth during said transitions, such that a radar signal enters the ground at uniform effective depth regardless of traction mode changes, maintaining continuity in subsurface mapping resolution; and wherein the processing unit computes a dynamic compensation factor for spectral distortion in hyperspectral imaging based on an instantaneous angular displacement of the inner ring relative to the base ring of the gimbal mechanism, said displacement corresponding to pitch and roll of the chassis frame, and the processing unit applies said dynamic compensation factor to each captured spectral frame to correct wavelength shift caused by optical angle deviation;

wherein each of the coupling shafts and gear linkages of each of the torque transition mechanisms are mechanically phased to effect a simultaneous partial engagement of both wheel and track driving elements at predefined angular phases of the motion-transmission shaft, the simultaneous partial engagement producing a mixed-traction operational state that reduces abrupt change in ground contact forces during mode transition and providing a mechanically smoothed transition sequence across the plurality of locomotion modules; and wherein the torque applied to each of the wheel bodies is monitored through torsional reaction transmitted into each of the coupling shafts and the motion-transmission shaft, and wherein the processing unit receives said torsional reaction as mechanical-state input via signal converters located in the chassis frame and uses a temporal pattern of torsional reaction to infer slippage events in individual locomotion modules and trigger coordinated mechanical rebalancing of torque distribution across the traction assembly, and wherein the processing unit is operatively coupled to the motion-transmission shaft of the synchronizing drive assembly and configured to continuously monitor an angular velocity and direction of rotation of said motion-transmission shaft through a mechanical signal converter mounted in the chassis frame, and wherein the processing unit temporally associates each recorded angular position of the motion-transmission shaft with a timing of radar pulses and hyperspectral frame captures generated by the geological detection assembly supported on the sensor carrier plate of the sensor stabilization assembly, the temporal association allowing the processing unit to reconstruct, for every incremental rotation of the traction assembly, a corresponding subsurface reflection dataset indexed to the instantaneous mechanical state of the robotic system, such that variations in radar return phase and spectral reflectance intensity are interpreted relative to an actual orientation of the gimbal mechanism and a contact geometry of the plurality of locomotion modules with the terrain surface during movement of the chassis frame.

2. The smart mining exploration robotic system of claim 1, wherein the processing unit receives continuous mechanical feedback from each of the compression dampers and coil springs of the suspension assembly in form of displacement magnitudes and damping rates, said continuous mechanical feedback being indicative of real-time terrain compliance and subsurface rigidity, and wherein the processing unit cross-correlates said continuous mechanical feedback with radar echo delay times from the geological detection assembly.

3. The smart mining exploration robotic system of claim 1, wherein the torque transition mechanism of the traction assembly is arranged so that axial rotation of the coupling shaft reconfigures an engagement state of the gear linkage between the wheel body and the drive sprocket by moving a splined coupling element along the coupling shaft, and wherein the coupling shaft is mechanically driven by the motion-transmission shaft of the synchronizing drive assembly such that the selective conversion between wheel-driven operation and track-driven operation is performed in coordinated sequence across all locomotion modules in response to uneven traction sensed through mechanical load transfer in the plurality of link arms.

4. The smart mining exploration robotic system of claim 1, wherein each said locomotion module of the traction assembly provides a mechanical load feedback path to the chassis frame by transferring differential torque through the coupling shaft into the motion transmission shaft, and wherein the motion-transmission shaft translates said differential torque into a rotational offset that is distributed to corresponding coupling shafts to redistribute propulsion torque among each of the wheel bodies and drive sprockets for maintaining uniform forward motion when individual locomotion modules encounter variable adhesion conditions; and wherein the traction assembly is configured to induce controlled incremental changes in local ground pressure by cyclically varying torque distribution through each of the coupling shafts during transit, the controlled incremental changes being timed by a predefined angular phase of the motion-transmission shaft so that resultant micropressure pulses produced by each of the wheel bodies and drive sprockets interact with the subsurface and generate mechanically correlated radar echo modulation captured by the geological detection assembly.

5. The smart mining exploration robotic system of claim 1, wherein each said link arm of the suspension assembly is connected to its respective locomotion module by the joint connector configured to allow controlled lateral and vertical displacement, the joint connector transmitting a magnitude and rate of displacement mechanically to the compression damper and coil spring, and wherein the plurality of link arms are arranged and preloaded to generate a baseline chassis elevation so that incremental deflection under load produces a predictable proportional mechanical output used by the synchronizing drive assembly to regulate simultaneous adjustments of traction engagement and orientation of the gimbal mechanism; and wherein each of the compression dampers in the suspension assembly are mechanically coupled to actuator said levers that introduce proportional rotational inputs into the motion-transmission shaft as a direct function of damper stroke, such that increased damper compression during downward displacement creates a rotational bias in the motion-transmission shaft that initiates compensatory coupling-shaft re-alignment and gimbal counter-rotation to preserve sensor orientation and traction contact.

6. The smart mining exploration robotic system of claim 1, wherein each said coil spring of the suspension assembly is dimensioned and arranged to store and release a mechanical energy during oscillatory motion of the plurality of link arms, the mechanical energy being transmitted through the joint connectors into the chassis frame and the motion transmission shaft to cause phase-locked corrective rotation to the coupling shafts and pulley set, a phase-locked corrective rotation reducing transient sensor jitter and transient torque spikes in the traction assembly during rapid terrain deflections; and wherein the plurality of link arms on opposite sides of the chassis frame are mechanically cross-coupled by structural members integrated into the chassis frame.

7. The smart mining exploration robotic system of claim 1, wherein the joint connectors coupling the plurality of link arms to the plurality of locomotion modules include compliance features that permit limited rotational freedom under high lateral load, the compliance features mechanically redirecting a portion of lateral forces into each of the compression dampers and coil springs to avoid direct transmission into the sensor stabilization assembly, thereby limiting off-axis disturbance to the sensor carrier plate during sideways impacts or sudden lateral ground shifts, and wherein the two-axis gimbal mechanism of the sensor stabilization assembly is mechanically linked to the motion-transmission shaft through the pulley set so that rotation of the motion-transmission shaft induces proportionate counter-rotation of the base ring and inner ring.

8. The smart mining exploration robotic system of claim 1, wherein the inner ring supporting the sensor carrier plate incorporates adjustable mechanical balance weights and flexural mounts that permit fine tuning of center of rotation relative to geological detection assembly mass distribution, the adjustable mechanical balance weights and mounts being set to minimize torque loads on bearings of the gimbal mechanism during combined operational motion of the traction assembly and suspension assembly, thereby extending stable sensor dwell time over each ground patch during mapping operations; and wherein the sensor carrier plate mechanically secures the geological detection assembly such that the ground-penetrating radar unit and the hyperspectral imaging unit share a common mechanical reference plane, and wherein the processing unit uses a physical co-location and fixed relative orientation of the radar and hyperspectral units on the sensor carrier plate to perform mechanically referenced co-registration of radar and spectral datasets through angular-position inputs from the base ring and inner ring.

9. The smart mining exploration robotic system of claim 1, wherein the motion transmission shaft of the synchronizing drive assembly is mounted along a longitudinal centerline of the chassis frame and supported by spaced bearing blocks integrated into the chassis frame, the spaced bearing blocks permitting controlled axial compliance, such that axial displacement under cumulative coupling-shaft loads adjusts gear engagement preload in each of the torque transition mechanisms; and wherein the motion-transmission shaft provides rotational timing references to all coupling shafts via a system of keyed couplers so that the synchronizing drive assembly enforces a phase alignment across the traction assembly, and wherein mechanical phase alignment is used by the processing unit as a deterministic timing source to tag sensor acquisitions with exact mechanical phase stamps representing a posture of the chassis frame at an instant of data capture.

10. The smart mining exploration robotic system of claim 1, wherein the synchronizing drive assembly uses a motion-transmission shaft rotational phase to cause synchronized incremental actuation of each of the torque transition mechanisms in a sequential rolling pattern along the traction assembly, the sequential rolling pattern reducing peak instantaneous torque demand on the motion-transmission shaft and providing a mechanically staged traction conversion that optimizes continuous ground contact of the plurality of locomotion modules.

11. The smart mining exploration robotic system of claim 1, wherein the processing unit utilizes angular displacement values of the base ring and the inner ring of the gimbal mechanism transmitted mechanically through the pulley set of the synchronizing drive assembly to determine an instantaneous orientation of the geological detection assembly relative to the chassis frame, and wherein said processing unit employs said angular displacement values as a mechanical reference to continuously adjust an alignment of a projection axis of the radar beam and hyperspectral field of view, maintaining perpendicularity between a sensing axes and a local tangent plane of the terrain surface being traversed.

12. The smart mining exploration robotic system of claim 1, wherein the processing unit constructs a spatio-temporal model of terrain inclination by integrating data representing a vertical displacement of the plurality of link arms and an angular velocity of the motion transmission shaft, the processing unit continuously correlating said spatio-temporal model with radar return delay variations from the geological detection assembly, such that the processing unit generates corrected depth maps compensating for an instantaneous tilt of the chassis frame, the corrected depth maps being derived from actual mechanical inclination data rather than from inertial sensors; and wherein the processing unit continuously tracks angular phase offsets between each of the coupling shaft of each of the torque transition mechanisms and the rotation of the motion-transmission shaft of the synchronizing drive assembly, and computes, from said angular phase offsets, a mechanical synchronization coefficient indicative of coordinated motion between the traction assembly and the suspension assembly, the processing unit subsequently adjusting a radar scanning rate of the geological detection assembly in direct proportion to said mechanical synchronization coefficient, such that radar scanning speed increases during stable mechanical coupling and decreases during unstable coupling, maintaining consistency of ground coverage density across varying terrain conditions.

13. The smart mining exploration robotic system of claim 1, wherein the processing unit derives a relative displacement matrix representing real-time vertical motion of the chassis frame by calculating cumulative compression states of all coil springs in the suspension assembly, and wherein the processing unit applies said relative displacement matrix to geometrically correct hyperspectral imagery from the geological detection assembly, adjusting each pixel's mapped ground coordinate to account for mechanical vertical motion of the chassis frame during sensor exposure.

14. The smart mining exploration robotic system of claim 1, wherein the processing unit compares mechanical deformation signatures derived from compression of each of the coil springs and damping responses of the suspension assembly with variations in backscattered radar signal strength, wherein comparing enables determination of sub-surface elasticity distribution by observing mechanical strain-induced modulation in radar signal amplitude, the processing unit using the mechanical strain-induced modulation correlation to classify underground layers as hard rock, sediment, or mineralized formation based solely on a co-occurrence of mechanical stiffness and electromagnetic reflectivity; and wherein the processing unit calculates an instantaneous scanning footprint of the geological detection assembly on the ground based on the angular orientation of the base ring and the inner ring of the gimbal mechanism and a height of the chassis frame derived from suspension displacement.

15. The smart mining exploration robotic system of claim 1, wherein the processing unit utilizes a rotational velocity of the motion-transmission shaft as a continuous mechanical clock reference to generate temporal alignment pulses for both radar and hyperspectral sensing operations, said temporal alignment pulses being mechanically synchronized with a chassis frame motion, enabling deterministic phase locking between emitted radar signals and chassis displacement, the mechanical clocking providing drift-free synchronization independent of electronic time sources and maintaining consistent spatial registration of mineral detection data with the ground traversed by the traction assembly, and wherein the processing unit determines localized mechanical deformation within the terrain surface by analyzing differences in angular acceleration of the coupling shafts across the plurality of locomotion modules of the traction assembly, such that when one coupling shaft exhibits a transient retardation relative to the motion-transmission shaft, the processing unit interprets said transient retardation as an increase in sub-surface density or mineral compaction directly beneath an affected wheel body, and correlates localized torque anomaly with variations in radar backscatter intensity captured by the geological detection assembly, producing a mechanical-sensor correlation map that identifies discrete high-density mineral inclusions within the ground being traversed.

16. The smart mining exploration robotic system of claim 1, wherein the processing unit compares a phase displacement between the motion-transmission shaft and each of the coupling shafts during differential terrain loading, and utilizes a magnitude of said phase displacement to scale a transmission power of the radar of the geological detection assembly; and wherein the processing unit reconstructs a multi-dimensional motion profile of the chassis frame by combining real-time angular data from the base ring and inner ring of the gimbal mechanism with translational displacement derived from compression of the suspension assembly, and applies the multi-dimensional motion profile to normalize hyperspectral image sequences acquired by the geological detection assembly, correcting distortions caused by chassis roll, pitch, and vertical bounce.

17. The smart mining exploration robotic system of claim 1, wherein the processing unit determines a differential mechanical lag data across the traction assembly by comparing angular velocities of each of the coupling shafts transmitted through the motion-transmission shaft, and wherein said differential mechanical lag data are utilized to predict mechanical slippage between traction elements and the terrain surface, upon which the processing unit reassigns weighting coefficients to radar reflections received during those intervals; and wherein the processing unit calculates a correlation matrix between a vibration amplitude of the compression dampers and a return echo amplitude of the ground penetrating radar unit, the correlation matrix being analyzed to isolate repetitive resonance patterns associated with crystalline mineral structures, and wherein the processing unit recognizes resonance harmonics generated by mineral formations based on their mechanical-electromagnetic coupling signature, enabling direct identification of mineralized zones without separate frequency scanning.

18. The smart mining exploration robotic system of claim 1, wherein the processing unit utilizes a time-varying rotational displacement of the motion-transmission shaft to generate a real-time terrain velocity vector representing a progression of the chassis frame across the ground, and integrates the real-time terrain velocity vector with radar reflection delay and hyperspectral scan angle data from the geological detection assembly, constructing a continuously updated ground-referenced mineral profile aligned with a physical trajectory of the robotic system, allowing spatially accurate mapping of mineral distribution synchronized to mechanical motion; and wherein the processing unit monitors changes in mechanical stiffness detected through a rate of coil spring compression in the suspension assembly, and correlates said changes in mechanical stiffness with changes in spectral reflectance curves from the hyperspectral imaging unit, using mechanical-spectral relationship to distinguish metallic minerals exhibiting high mechanical rigidity from soft sedimentary materials based on simultaneous mechanical deflection characteristics and spectral absorption response obtained during a same ground contact interval of the traction assembly; and wherein the processing unit employs a rotational inertia of the motion-transmission shaft as a continuous mechanical reference for stabilizing temporal registration between radar pulse emission and echo reception cycles, and in a slippage event of transient oscillations of the chassis frame caused by uneven terrain, the processing unit adjusts a radar echo window based on predicted angular inertia delay of the shaft, such that signal acquisition occurs only during a steady-state portion of shaft rotation, ensuring that mineral detection data correspond exclusively to mechanically stable operating intervals of the robotic system during subterranean exploration.

19. The smart mining exploration robotic system of claim 1, wherein the geological detection assembly functions as a multi-sensor geological sensor array consisting of the ground penetrating radar unit, the hyperspectral imaging unit, and electromagnetic field detection elements integrated on same said sensor carrier plate of the sensor stabilization assembly, and wherein the processing unit executes a mechanically indexed data-fusion operation by aligning an acquisition timing of each sensing modality to a rotational state of the motion-transmission shaft of the synchronizing drive assembly, such that every radar echo, spectral frame, and electromagnetic anomaly sample is temporally anchored to a specific angular phase of chassis movement, the alignment enabling the processing unit to generate composite mineral detection outputs that express both electromagnetic and optical characteristics of subsurface strata in strict correlation with a mechanical position and vibration condition of the robotic system during exploration.

* * * * *